United States Patent
Rosales et al.

(10) Patent No.: US 10,403,135 B2
(45) Date of Patent: Sep. 3, 2019

(54) NETWORK INFRASTRUCTURE FOR COLLABORATIVE AUTOMATED DRIVING

(71) Applicant: Intel IP Corporation, Santa Clara, CA (US)

(72) Inventors: Rafael Rosales, Guadalajara (MX); Rainer Makowitz, Munich (DE); Ralf Graefe, Haar (DE); Mark Kelly, Dublin (IE); Keith Nolan, Mullingar (IE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/858,417

(22) Filed: Dec. 29, 2017

(65) Prior Publication Data

US 2019/0043350 A1    Feb. 7, 2019

(51) Int. Cl.
*G08G 1/09* (2006.01)
*G08G 1/0967* (2006.01)
*H04L 12/24* (2006.01)
*H04W 4/44* (2018.01)
*H04L 29/08* (2006.01)

(52) U.S. Cl.
CPC ....... *G08G 1/091* (2013.01); *G08G 1/096783* (2013.01); *H04L 41/0823* (2013.01); *H04L 67/12* (2013.01); *H04W 4/44* (2018.02)

(58) Field of Classification Search
None
See application file for complete search history.

(56) References Cited

U.S. PATENT DOCUMENTS

2005/0129410 A1* 6/2005 Wilsey ............... H04B 10/1143
398/153
2016/0080235 A1* 3/2016 Tan ..................... H04L 43/0888
370/235

OTHER PUBLICATIONS

"Intelligent Transport Systems (ITS); Communications Architecture", ETSI EN 302 665 V1.1.1 (Sep. 2010), (2010), 44 pgs.
"Mobile Edge Computing (MEC); Framework and Reference Architecture", ETSI GS MEC 003 V1.1.1 (Mar. 2016), (2016), 18 pgs.
Holmberg, Johan, "Train Communication Networks", AS-0.3100—Seminar Report Nov. 12, 2015, 35 pgs.

* cited by examiner

*Primary Examiner* — Adolf Dsouza
(74) *Attorney, Agent, or Firm* — Schwegman Lundberg & Woessner, P.A.

(57) ABSTRACT

Various systems and methods for a roadside network. The roadside network includes one or more processors to receive gather traffic data from a first set and a second set of sensors associated with a first sector and second sector, respectfully. A minimum forward visibility range is determined. Portions of the sectors overlap to provide the minimum forward visibility range. Processed traffic data is generated based on the traffic data for both sectors. The processed traffic data is then sent to antennas to be transmitted to the respective sector.

23 Claims, 14 Drawing Sheets

NETWORK INFRASTRUCTURE FOR COLLABORATIVE AUTOMATED DRIVING

TECHNICAL FIELD

Embodiments described herein generally relate to processing techniques used with data communications and interconnected device networks, and in particular to techniques applied within internet of things (IoT) devices and device networks. Networks and devices that enable cooperative automated driving are one example of the embodiments described herein.

BACKGROUND

IoT devices are physical objects that may communicate on a network, and may include sensors, actuators, and other input/output components, such as to collect data or perform actions from a real-world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF). An example of using IoT technology is in a roadside network that may assist automated driving.

Vehicular communication systems, such as vehicle-to-vehicle (V2V) and infrastructure-to-vehicle (I2V) communication paradigms, have been proposed for use with cooperative intelligent transport systems (ITS). These systems may extend the visibility range of vehicles beyond what expensive sensors mounted onboard vehicles may achieve. Cooperative ITS may be implemented using Dedicated Short Range Communications (DSRC) or cellular-based communication (LTE).

In Europe, a reference ITS communications architecture has been specified by ETSI. This architecture describes the architecture elements, such as central, vehicle, and roadside units, as well as the protocol stack, management and security services. This reference architecture, however, does not specify any specific roadside network architecture implementation.

Multi-access Edge Computing (MEC), is another alternative communications architecture, where latency is minimized by moving the processing elements as near as possible to the mobile users for applications using the cellular network.

Past and present trials and research projects on DSRC V2X (e.g. simTD, Pre-Drive C2X), cellular V2X (e.g. CoCar, ConVeX, Towards 5G, 5GCAR) and hybrid V2X (e.g. Converge, METIS, UK CITE) aim to implement a proof of concept to evaluate the feasibility of cooperative ITS.

Vehicular ad-hoc networks are not able to guarantee a minimum level of visibility range beyond the vehicle's sensors; thus, these networks may not provide a suitable solution for highly dependable communication of environment data. Neither ETSI MEC, ETSI ITS, nor 3GPP 5G standards aim to address the implementation aspects of roadside networks, and thus do not provide reference designs for particular use cases, such as the optimized provision of environment data to vehicles on the freeway.

Both DSRC and sidelink cellular-based V2X, defined in 3GPP LTE Rel. 14, are limited in the maximum visibility range. Furthermore, they only address the communication aspect and thus would rely on ad-hoc networks to obtain the environment information. Thus, these wireless communication systems are only a part of an ITS solution for automated driving.

Existing field trials on V2X communication have been limited to a static network of road side units (RSUs) that have not been designed to guarantee an extended visibility range of vehicles with the dependability requirements of automated driving, and are unable to dynamically adapt to changing road scenarios that have different requirements.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for a reconfigurable roadside network that adapts to a traffic scenario that may optimize one or more key performance indicators (KPI). The roadside network may divide a road into different sectors that overlap to provide vehicles with data.

The techniques discussed herein include a system/network that optimizes cooperative automated driving using KPIs. For example, KPIs may include vehicle forward visibility range, vehicle backward visibility range, communication bandwidth, communication latency, dependability attributes, reliability safety severity, functional safety severity, cost, etc.

Figure 1:
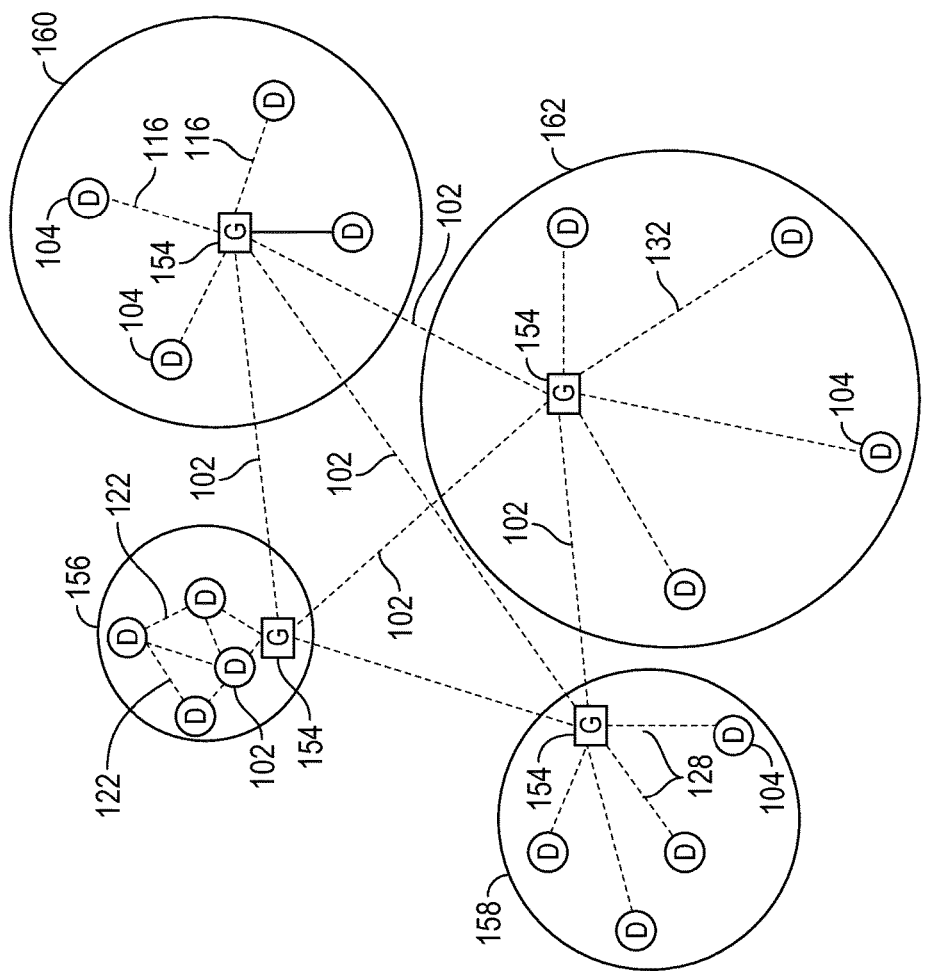
FIG. 1 illustrates a domain topology for respective internet-of-things (IoT) networks coupled through links to respective gateways, according to an example.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
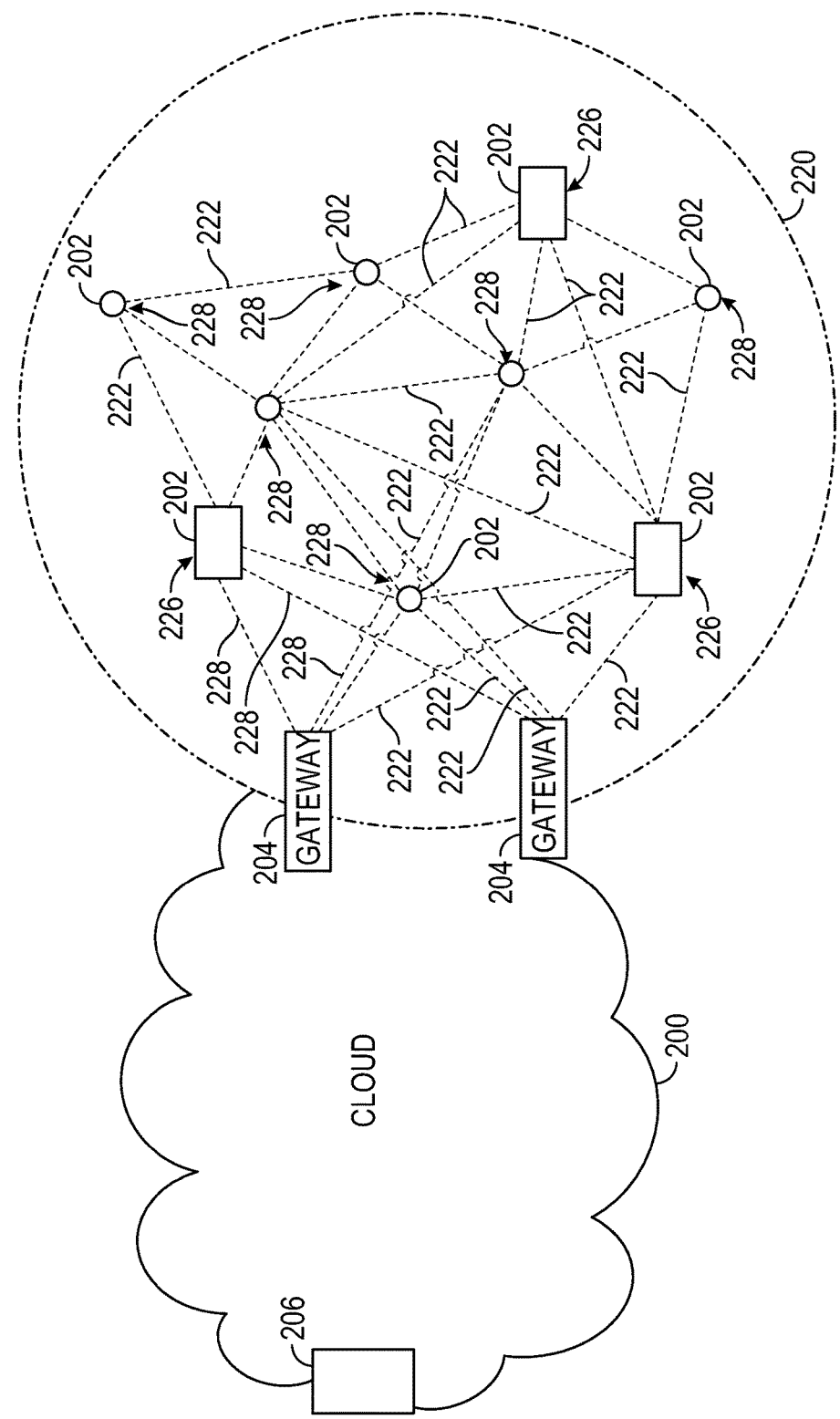
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIG. 1 and FIG. 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 13 and 14.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be a massively interconnected network wherein many IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available. One example of using IoT devices 202 is to use them in a roadside network infrastructure that may be used to assist collaborative automated driving (C-AD).

Figure 3:
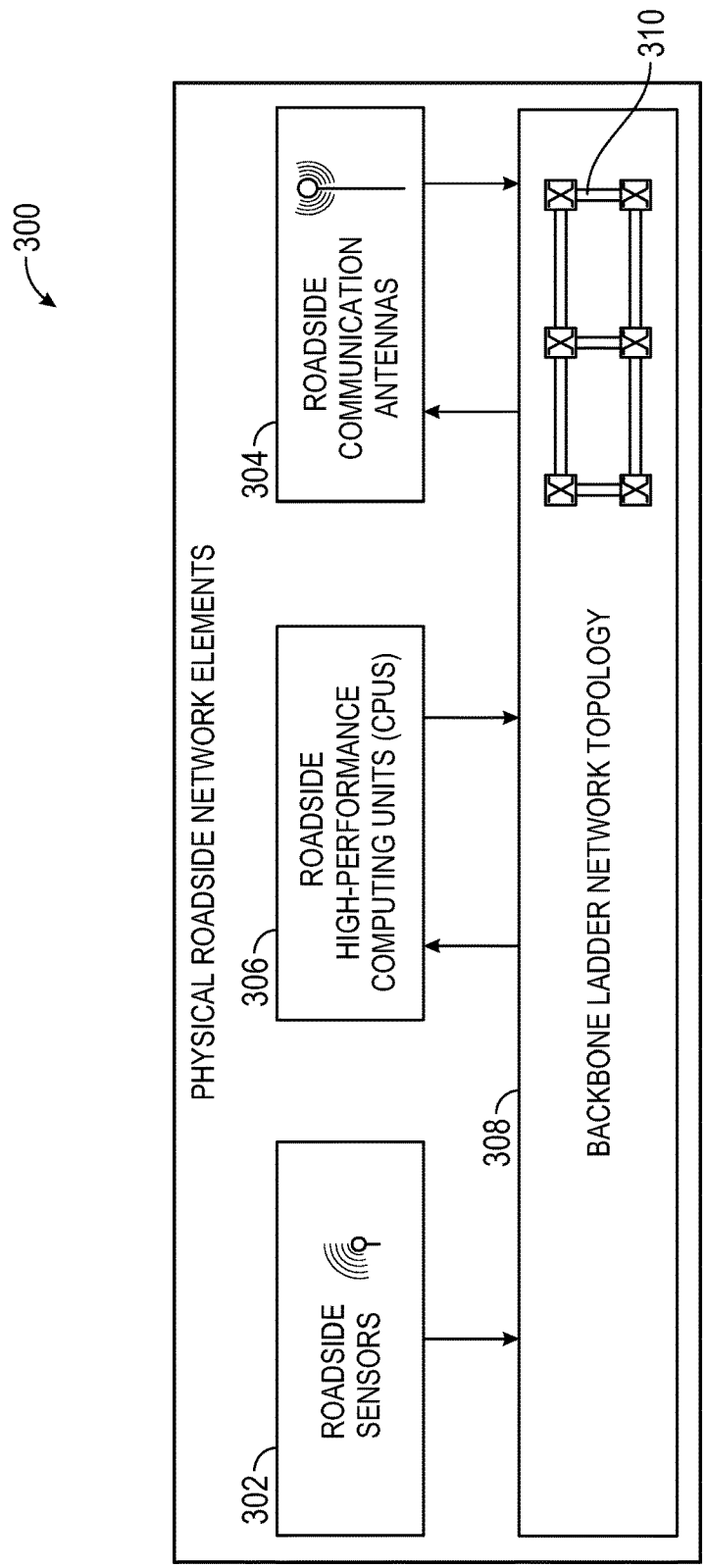
FIG. 3 illustrates a roadside network, according to an example.

FIG. 3 illustrates a roadside network 300, according to an example. The roadside network 300 may include roadside sensors 302, communication antennas 304, CPUs 306, and a communication backbone 308. These items may be deployed along a road, such as a freeway, in a layout that redundantly covers each road sector with two antennas and two sensors. In addition, each sensor, antenna, and CPU may be interconnected as part of a ladder topology with dual homing 310. Each X in the illustrated ladder topology is a switch used to interconnect components of the roadside network 300. Dual homing refers to a network device which has two interfaces. In an example, only one interface is active, and the second one is used in case of failure.

CPUs 306 of the roadside network 300 may process data from a portion of the road. The portion of the road, e.g., sectors, may be defined by range of the antennas 304 and/or sensors 302 that are connected to a single CPU. Each sector has a communication range defined by the range of the antennas 304 in the sector and a sensor range 302 that is defined by the range of the sensors 302. The road sectors ranges may overlap with a portion of adjoining sector ranges. In an example, the sensor ranges may overlap while the communication ranges do not overlap. In another example, the communication ranges may overlap while the sensor ranges do not overlap. In other examples, both the communication ranges and the sensors ranges from different sectors overlap.

Figure 4:
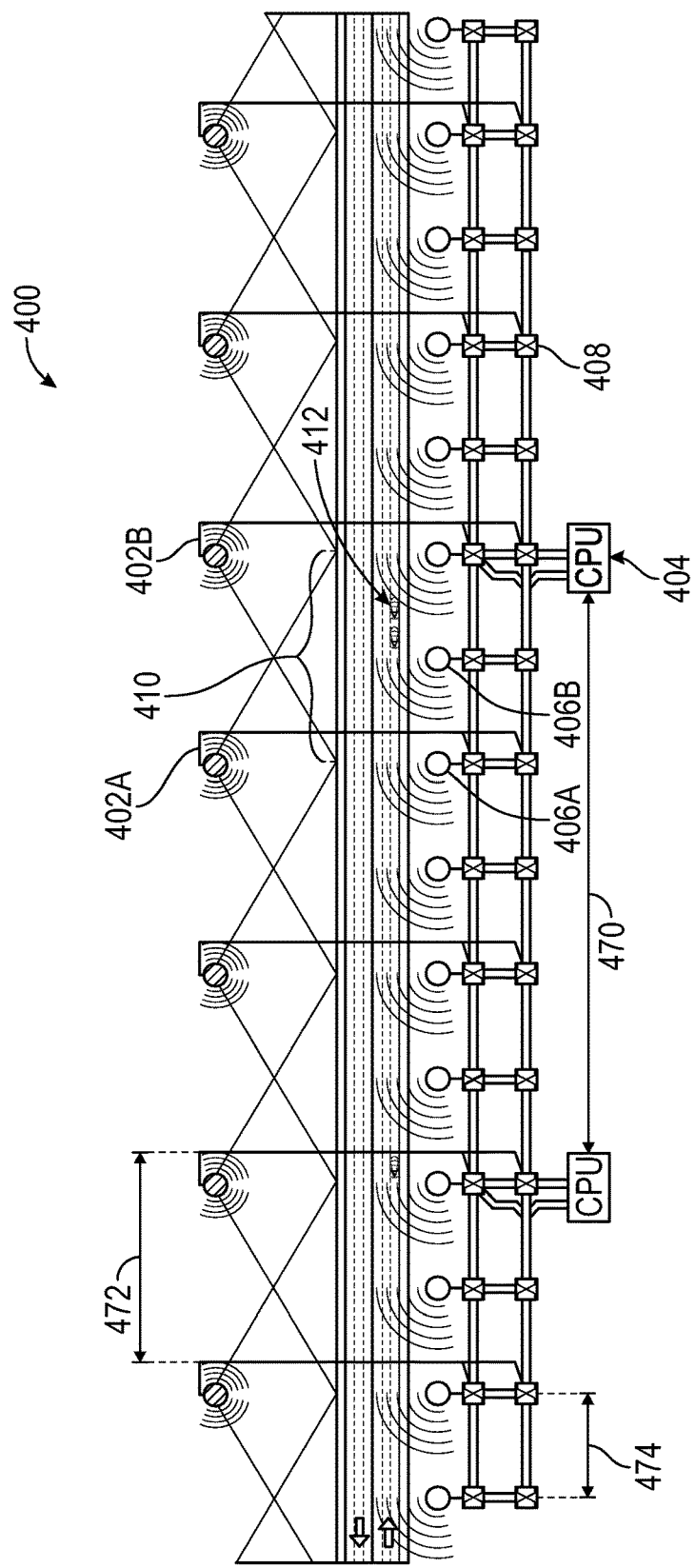
FIG. 4 illustrates a physical layout of a roadside network, according to an example.

FIG. 4 illustrates a physical layout of a roadside network 400, according to an example. The roadside network 400 includes antennas, e.g., 402A and 402B (collectively referred to as 402), sensors, e.g., 406A and 406B (collectively referred to as 406), CPUs, e.g., 404, that are connected as part of the roadside network 400. The sensors 406 and the antennas 402 of the roadside network 400 allow measurement of traffic flow and traffic density. In an example, these values may be calculated from sensor data. The traffic flow and traffic density may also be calculated using data obtained by the antennas, such as GPS information sent through vehicle-to-infrastructure communication. A switch 408 may be used as part of a ladder network to redundantly provide data to CPUs 404 that are part of the roadside network 400.

Antennas 402 may be separated by an inter-antenna spacing 472. In an example, the inter-antenna spacing 472 may be 100 meters (m). Inter-sensor spacing 474 is the space between sensors, e.g., 402A and 402B, and may be 50 m. The spacing between antennas 402 and sensors 406 may be based upon the environment surrounding a road covered by the roadside network 400. In an example, the spacing is such that each road sector is partially redundantly covered by at least two antennas and two sensors. Accordingly, the inter-antenna spacing 472 and inter-sensor spacing 474 may change to ensure this redundancy. In another example, each sector may have redundant coverage over the entire sector based on the neighboring sectors. The roadside network 400 also includes multiple CPUs, e.g., 404, that have an inter-CPU spacing 470. The inter-CPU spacing 470 may be based on the inter-antenna spacing 472 and inter-sensor spacing 474 and the capabilities of the CPU 404. For example, the CPU 404 may have capacity to handle data from four antennas 402 and six sensors 406. The inter-antenna spacing 472 and inter-sensor spacing 474, therefore, may be used to determine the inter-CPU spacing 470. In an example, the inter-CPU spacing 470 is such that a single CPU 404 may only be at fifty percent or less of capacity, such that the roadside network 400 could still perform with a CPU failure rate of fifty percent.

In an example, the roadside network 400 is configured such that each part of a monitored road is redundantly covered by antennas and/or sensors. For example, the antennas 402A and 402B may both cover an overlapping sector 410, and therefore, vehicle 412. The overlapping sector 410 is also covered by sensors 406A and 406B. The overlapping sector 410, therefore, is redundantly covered by the sensors 406A and 406B and antennas 402A and 402B. In another example, the sensors and/or antennas for a sector may not be adjacent to other sensors and/or antennas within the sector. For example, sensors from two or more sectors may be intermixed.

The antennas 402A and 402B may use various wireless communication technology to transmit data. Vehicles may use corresponding wireless communication technology to simultaneously receive data from the antennas 402A and 402B.

In an example, the sensors 406A and 406B may be an IoT device and may include radar. The sensors 406A and 406B may collect various data associated with a road sector. The data may include a list of detect objects on the road sector, position, velocity (heading direction and speed), measurement accuracy, vehicle dimensions, object classification (truck, person, small vehicle), etc. The sensors 406A and 406B may send data to either of the antennas 402A and 402B or directly to a CPU 404. In an example, both antennas 402A and 402B receive data from the sensors 406A and 406B. The data from one road sector may be sent to the CPU 404. In an example, the CPU 404 processes data for one road sector. Thus, data from the sensor 406B would be transmitted to the CPU 404 and the data from the sensor 406A would be sent to a different CPU. In this example, the processed data transmitted from the antenna 406A and the antenna 406B would also be different and associated with different road sectors. The vehicle 412 may receive data from both the antenna 406A and the antenna 406B.

The CPU 404 may process the data from multiple antennas and sensors. The CPU 404 may then provide the processed data to the antenna 402B for transmission to vehicles within the road sector that includes the antenna 402B. The CPU 404 may process data received from the sensor 406B to create processed data, such as dynamic information about the environment within a road sector. This information may include current position of vehicles, velocity, size of detected objects, etc. The information may also include information such as predicted values that may include a future position of a vehicle. For example, where a vehicle will be located in 50, 100, 250 milliseconds, etc. in the future may be transmitted to vehicles. The CPU 404 may filter the data such that a subset of all the available data is transmitted.

In physical roadside network 400, as shown in FIG. 4, the inter-distance between single communication antennas 472 and sensors 474 provides a redundant coverage of the region 410 to enable dynamic reconfigurations that exploit spatial redundancy to tradeoff between KPIs, such as bandwidth and reliability.

Furthermore, each sensor, e.g., 406A and 406B, antenna, e.g., 402A and 402B, and CPU, e.g., 4004, may be attached to two or more switches, e.g., 408, in the ladder backbone for high availability as even when multiple links fail, the system keeps functioning. This physical infrastructure based on a switched backbone allows the sensor and the communication ranges to be dynamically reconfigured to provide automated vehicles with environment information according to the traffic-scenario.

In an example, the processing power of the CPUs 404 may limit the size of the monitored regions, as only a limited amount of sensor data may be processed/fused together. Thus, the use of higher performing CPUs 404 may extend the minimum achievable visibility range by enabling the configuration of wide monitored regions.

In an example, to automatically reconfigure the roadside network to optimize the KPIs, current KPI requirements are identified and the roadside network is reconfigured based on the identified KPI requirements. To identify current KPI requirements, a current traffic scenario may be identified. For example, CPUs may monitor one or more road sectors and apply a rule or inference-based scenario detection algorithm. The traffic scenario may be determined based on measurement data from one or more sensors. The identified traffic scenario may then be used to determine a set of target KPI values. In an example, the target KPI values may be obtained via a lookup table of predefined values. The predefined values may be based on the default roadside network configuration.

The identified KPI requirements may then be used to reconfigure the roadside network. Prior to reconfiguration, the roadside network is associated with KPI values that were used to configure the roadside network into its current configuration. The identified KPI requirements are compared with these old KPI values. If any identified KPI requirement is not met by the old KPI values, the roadside network may be reconfigured to meet all the identified KPI requirements. Reconfiguration of the roadside network may include configuration of adjacent sensors and communication antennas. This reconfiguration may change the range of the sensors and communication antennas within a sector. For example, sensors and/or communication antennas may be added or removed from a sector.

Road conditions may change. For example, a road may have more vehicles in road sectors during certain parts of the day such as rush hour. Conversely, in early morning hours a road may have significantly less vehicles. At other parts of the day, some road sectors may have significantly more vehicles than other road sectors. As an example, roads traveling in one direction may have significantly more vehicles than a corresponding road traveling in the opposite direction. The roadside network may be reconfigured based on current road conditions.

The roadside network may be dynamically configured based on environment information. Environment information may include both a static and a dynamic status of the road, such as road topology, traffic signs, temporary road constructions, traffic lights, vehicle positions and velocities, traffic flow, traffic density, etc. A dynamically configurable roadside network may provide automated vehicles with more dependable environment information which may be a key to the vehicle safety. In addition, such a roadside network may extend the vehicle visibility range beyond the limits of onboard sensors.

The roadside network may be configured based upon KPIs. For example, the roadside network may be optimized for one or more KPIs. KPIs may include the visibility range of vehicles, latency, and dependability. The visibility range may be limited by, first, the physical layout of sensors and communication antennas that determine the minimum and maximum forward and backward visibility range. In addition, the available computing power to perform the sensor fusion on the road sector in question may also impact visibility. The total latency may be influenced by the system architecture, e.g., the proximity of the CPU to the road sector being monitored as well as the overhead of dependability increasing mechanisms. Regarding dependability attributes, the overall system availability and reliability may depend on the grade of computation and communication redundancy provided, spatial and/or temporal.

Figure 5:
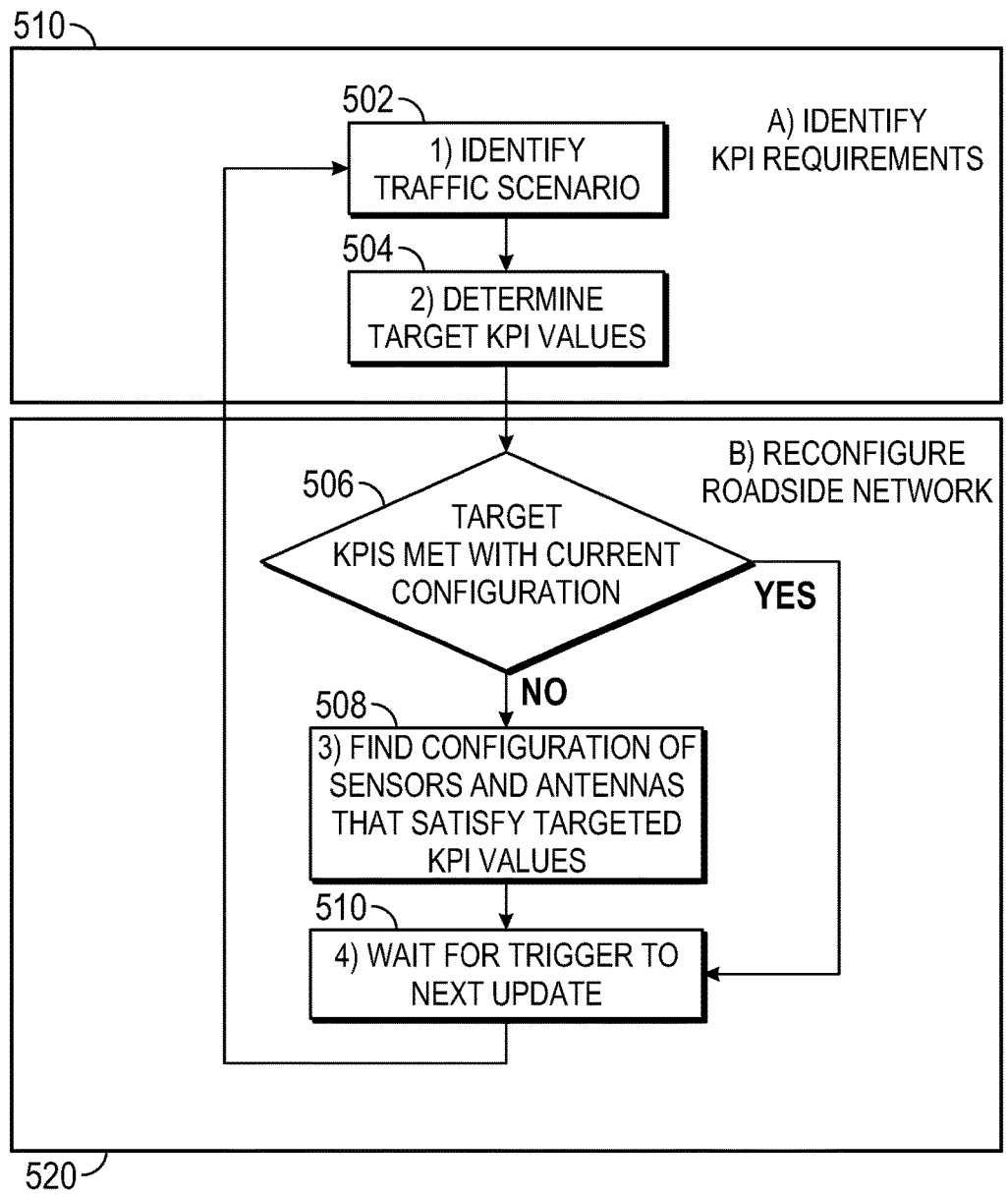
FIG. 5 illustrates reconfiguration of a roadside network, according to an example.

FIG. 5 illustrates reconfiguration of a roadside network, according to an example. The reconfiguration of the roadside network may be done by optimizing KPIs for the roadside network. A first part 510 of the reconfiguration identifies the KPI requirements for the roadside network. The KPI requirements are influenced by the current traffic scenario. For example, if there is a traffic jam with lots of vehicles in a road sector, that road sector may need increased bandwidth and processing capabilities. Accordingly, the traffic scenario of a road sector is identified at operation 502.

KPI requirements of environment information may be interrelated and may be dependent on the traffic scenario. For example, low density, high speed traffic demands a high forward visibility range but low communication bandwidth as just a few vehicles are present. High density, low speed traffic may require a high amount of communication bandwidth to distribute the environment conditions, but the forward visibility range is not as high as the low density example. The maximum tolerated latency for the reliable transmission of environment information of data originating far away from the vicinity of a vehicle may be increased with an increase in forward visibility range. After the traffic scenario is determined, target KPI parameters and values may then be determined based on the traffic scenario at operation 504.

Figure 8:
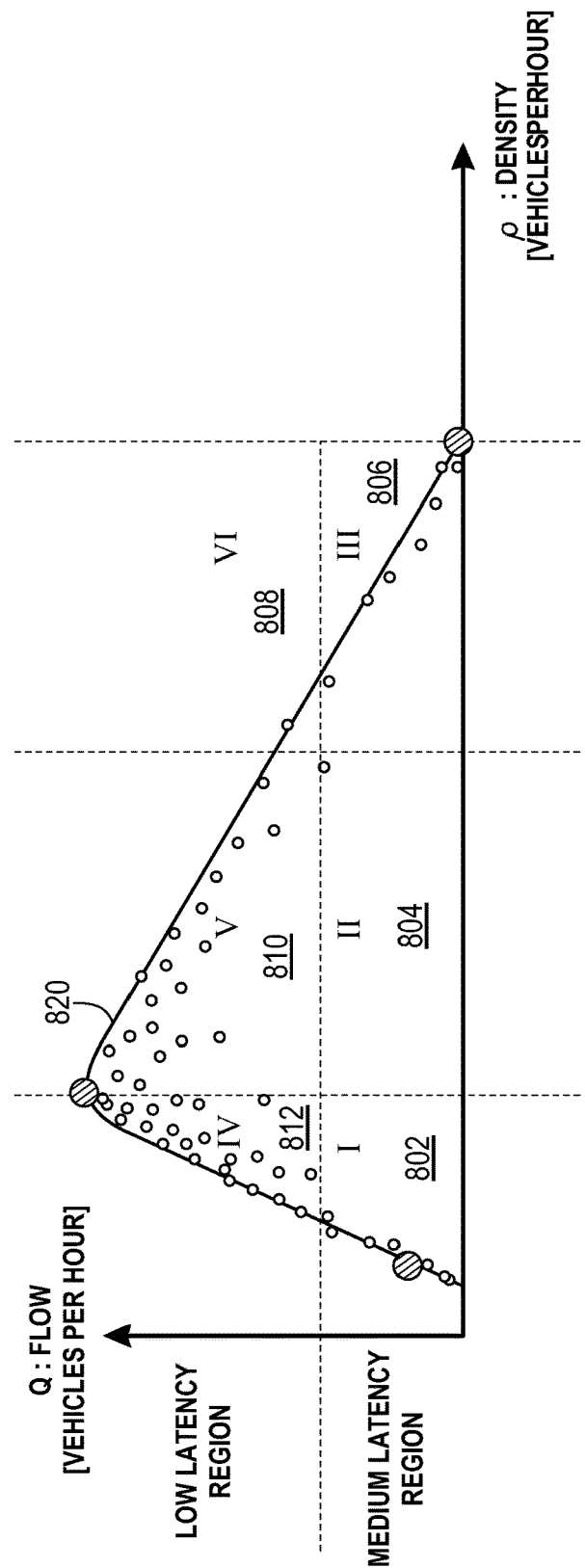
FIG. 8 illustrates six different traffic scenarios, according to an example.

In an example, there may be various traffic scenarios, such as six different scenarios. The different scenarios may be determined based on the current traffic flow within a road sector and/or the traffic density within a road sector. FIG. 8 illustrates six different traffic scenarios 802, 804, 806, 808, 810, and 812, according to an example. In an example, vehicle flow Q (vehicles per hour) and the vehicle density p (vehicles per km) may be used to determine the traffic scenario. Observed measurements of traffic flow and density may approximately follow a curve 820 defined by the fundamental diagram which represents an idealized characterization of the road. The curve 820 is useful to derive the free flow speed, road capacity, critical density, jam density, etc. of a road sector.

KPI parameters may be determined for each of the six traffic scenarios based on regions 802, 804, 806, 808, 810, and 812. For example, if the vehicle density is below the critical density, e.g., the regions I 802 and IV 812, the vehicles are free to move at maximum speed, but the wireless communication bandwidth requirement is low as there is little information that needs to be communicated to the vehicles. If the vehicle density is very high (regions III 806 and VI 808), the freeway may be considered congested and no vehicle may move so the forward visibility range requirement for vehicles is at its minimum. However, due to the high number of vehicles, the amount of environment information that needs to be transmitted the needed bandwidth maximal. Regions II 804 and V 810 in turn, are in between these two extremes.

With respect to latency, the regions IV 812, V 810, and VI 808 have more strict latency requirements than the regions I 802, II 804, and III 806. The stricter latency requirements are due to the increased flow of vehicles in the regions IV 812, V 810, and VI 808 compared to the regions I 802, II 804, and III 806. To illustrate, region I 802 has both very low density and flow, which means that the freeway is relatively empty and thus, if a high visibility range is provided, the need for very low latency updates is reduced. Region IV 812, however, has a higher flow of vehicles potentially at high speed due to low vehicle density, increasing the need for low latency communication.

Figure 9:
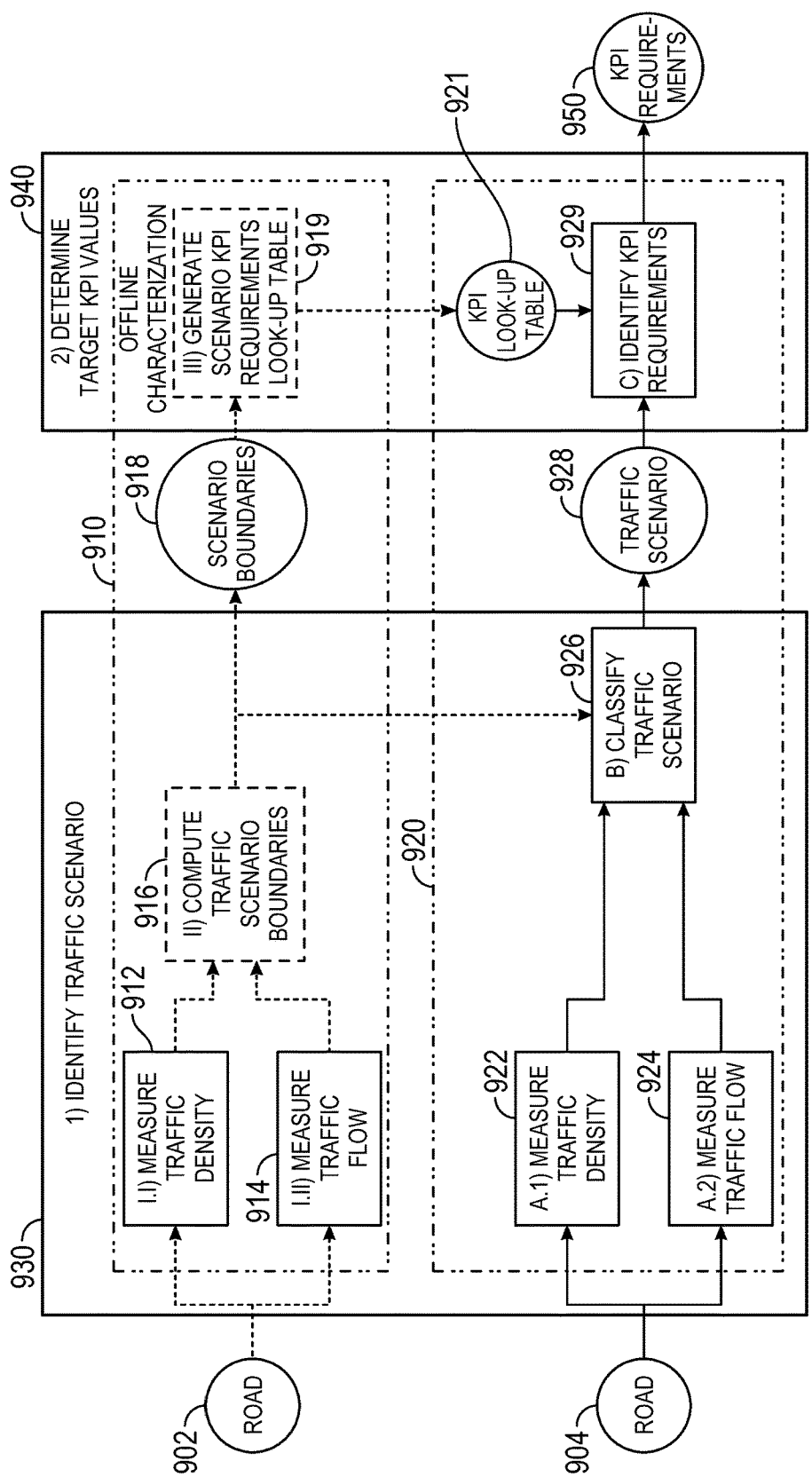
FIG. 9 illustrates a dataflow for identifying a traffic scenario and KPI determination, according to an example.

FIG. 9 illustrates a dataflow for identifying a traffic scenario and KPI determination, according to an example. A traffic scenario identification process 930 and a determination of the corresponding KPI requirements 950 may include an offline 910 and a runtime procedure 920. The offline procedure 910 measures traffic data along a road 902 over a long window of time to gather data that may be used to calculate traffic scenario boundaries. The offline procedure 910, therefore, is not considered a runtime procedure since it gathers data over a broad time window. In addition, the offline procedure 910 allows for the traffic boundaries to be different for different roads, e.g., 902, and/or groups of road sectors. This flexibility allows a roadside network to respond to real-world conditions rather than more generic system parameters. Further, the offline procedure 910 may run on a schedule or may run continuously. The traffic scenario boundaries may be adjusted accordingly.

In an example, the offline procedure measures the traffic density 912 and traffic flow 914 over a broad time window. The traffic density and traffic flow may be measured using radar sensors, loop detectors, and/or vehicle data. Using the measured traffic density and traffic flow, the traffic scenario boundaries may be computed 916. The fundamental diagram, see FIG. 8, may be estimated from the traffic density and flow measurements. This diagram may be used to define the scenario boundaries 918. In an example, this may be done by defining various parameters that define the traffic scenario boundaries. For example, the threshold value $\rho_{low}$ may be defined as the critical density of the fundamental diagram. The threshold value $\rho_{high}$ may be defined as at a traffic density value corresponding to a maximum vehicle speed of half the value of the free flow speed. The threshold value $Q_{low}$, may be defined as the vehicle flow corresponding to a maximum vehicle speed of 50 km/h. These values may then later be used by the runtime procedure.

Using the parameters derived from the diagram, scenario KPI requirements are identified. These values may then be used to generate 919 a KPI look-up table 921 that is used by the runtime procedure 920. In an example, each stored traffic scenario region includes the threshold boundaries: $\rho_{low}$, $\rho_{high}$, and $Q_{low}$, a set of required values for each KPI, e.g., minimum forward/backward visibility range, minimum bandwidth, maximum latency, reliability (e.g., mean-time-to-failure), and severity level (e.g., as defined in ISO 26262 "Road vehicles—Functional safety"). These values may be obtained through analysis and/or simulation.

Figure 10:
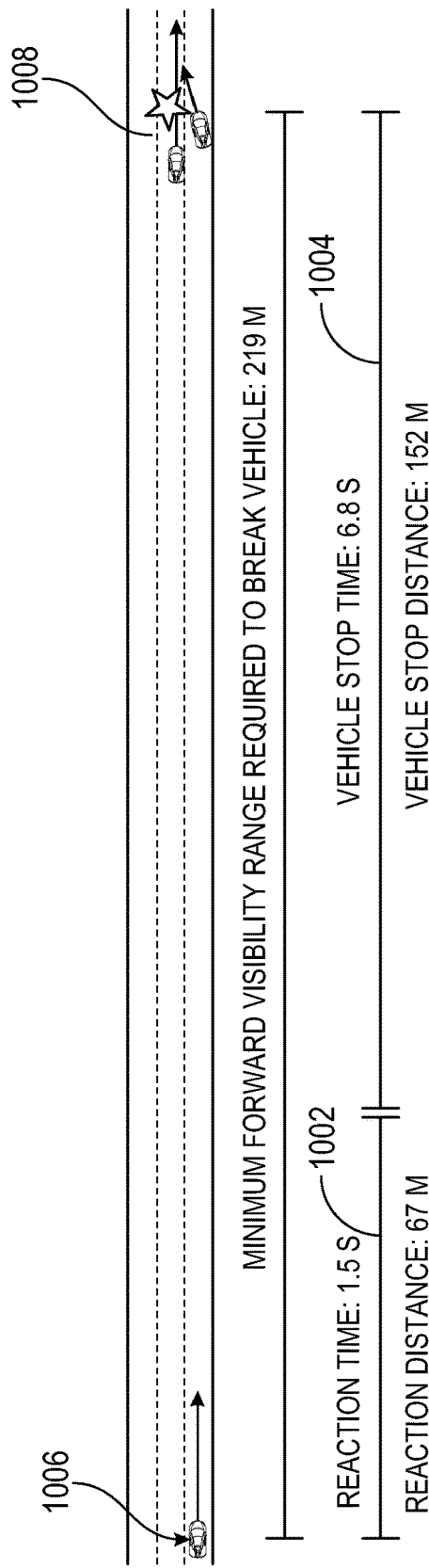
FIG. 10 illustrates an example for determining a minimum forward visibility range, according to an example.

FIG. 10 illustrates an example for determining a minimum forward visibility range, according to an example. For example, a vehicle traveling at 160 km/h needs a forward visibility range of 219 m. The 219 m allows for both reaction time 1002 and vehicle stop time 1004. Setting the minimum forward visibility range to 219 m provides for enough time for the roadside network to receive traffic data, process traffic data, transmit traffic environment information to a vehicle 1006, and the vehicle 1006 to respond to the traffic environment data. In the example illustrated in FIG. 10, the vehicle 1006 is driving at 160 km/h or slower. An accident 1008 is 219 m directly in front of the vehicle 1006. Configuring the roadside network to provide a minimum of 219 m of forward visibility range allows the vehicle 1006 and network 1.5 s to react to environmental data indicating the accident 1008. In addition, the 219 m allows for 6.8 s, or 152 m, for the vehicle 1006 to stop before reaching the accident 1008.

Returning to the discussion of FIG. 9, the runtime procedure 920 determines the KPI requirements for a road 904 and/or road sector based on real-time data. The road 904 may be the same as the road 902. The runtime procedure includes measuring the current traffic density 922 and the current traffic flow 924. In an example, the current traffic density and flow are calculated using a 5-minute time window with data from sensors such as radar sensors, loop detectors, and/or vehicle data from vehicles on the road 904.

Using the current traffic density, current traffic flow, and the computed traffic scenario boundaries from 916, the current traffic scenario 928 is determined/classified 926. In an example, the current traffic scenario 928 is one of the six different traffic scenarios illustrated FIG. 8. The current traffic scenario 928 may be determined by comparing the measured current traffic density and current traffic flow to the threshold values:

$$TrafficScenario(Q, \rho) = \begin{cases} \text{Scenario } I, & Q < Q_{low} \wedge \rho < \rho_{low} \\ \text{Scenario } II, & Q < Q_{low} \wedge \rho_{low} \leq \rho < \rho_{high} \\ \text{Scenario } III, & Q < Q_{low} \wedge \rho \geq \rho_{high} \\ \text{Scenario } IV, & Q \geq Q_{low} \wedge \rho < \rho_{low} \\ \text{Scenario } V, & Q \geq Q_{low} \wedge \rho_{low} \leq \rho < \rho_{high} \\ \text{Scenario } VI, & Q \geq Q_{low} \wedge \rho \geq \rho_{high} \end{cases}$$

where Q is the measured current traffic flow, $\rho$ is the measured current traffic density, $Q_{low}$ is the traffic flow threshold 1, $\rho_{low}$ is the traffic density threshold 1, and $\rho_{high}$ is the traffic density threshold 2. Based on the identified traffic scenario, the KPI look-up table 921 may be used to identify real-time KPI requirements 929 for the roadside network.

Returning to FIG. 5, once the KPI requirements are determined based on current traffic density and current traffic flow data, the roadside network may be reconfigured 520 based on the identified target KPI parameters. The current roadside network configuration and its capabilities are matched against the target KPIs from operation 504 at operation 506. If the current roadside network meets the target KPIs, then no reconfiguration is needed. The system may then wait for the next reconfiguration trigger at operation 510.

A trigger may be based on a timer or schedule. In another example, a reconfiguration may occur based on a set of event triggers may be set to adjust the sensitivity of a reconfiguration response for the roadside network. For example, the roadside network may check if a reconfiguration is needed every 5, 10, 15, 30, 60, etc., minutes. Data collected from sensors may also be used to trigger a reconfiguration determination. For example, if traffic increases or decreases by predefined percentage, e.g., 25%, 50%, 100%, etc., the roadside network may check if a reconfiguration is needed. As another example, a percentage change in average vehicle speed may be used to trigger a possible reconfiguration.

If the current roadside network does not meet the target KPIs, then a new configuration is determined at operation 508. The new configuration may specify a set of sensors and antennas that are logically connected to a CPU. The configuration, therefore, determines the monitored regions, e.g., sectors or sectors, as well as the environment information distribution area. The roadside network may then be reconfigured based on the new configuration. Sensors and antennas that cover one or more road sectors may be dynamically reconfigured. For example, the CPU that a sensor and/or antenna is connected to may be changed via switches. In this example, a road sector is determined by the range of the sensors and antennas connected to a single CPU. Accordingly, a CPU may be part of a roadside network, but due to traffic scenarios may not have any connected sensors or antennas. When this occurs, the CPU may enter a low power mode until the CPU is needed based on traffic scenarios. After the roadside network is reconfigured, the system waits for the next trigger at the operation 510. Once triggered, the system starts the reconfiguration process over by going to operation 502.

In an example, each sensor and antennas of the roadside network may be assigned or mapped to one or more CPUs. This enables the path between the information source, processing elements, and information destination for C-AD use cases to be dynamically configured to KPIs, such as control latency. In addition, the switching allows for redundant coverage areas of sensors and/or antennas. The dynamic reconfiguration also allows a minimum forward visibility range greater than zero based on overlapping coverage areas and current traffic conditions. The dependability of the roadside network may also be improved, in a functional safety context, due to the multiple system channels.

A configuration of the roadside network may include a mapping of sensor and antennas to CPUs. A given configuration may determine a trade-off in various KPIs, such as minimum forward visibility range, reliability, etc. A configuration that meets certain KPIs may be determined using an inverse function. In an example, a configuration is determined using an offline multi-objective optimization process that produces the set of optimal configurations with their respective achieved KPI values. The configuration and achieved KPI values may be stored in a look-up table for later use in determining a configuration based on real-time data from sensors of the roadside network.

Reconfiguring the sensing and communication regions of a road sector by defining the number of sensors and antennas connected to a CPU enables to trade-off between various KPIs. For example, the maximum latency and the minimum and maximum forward/backward visibility range may be traded-off by symmetric or asymmetric communication and sensing regions. The availability and reliability of the network may be adjusted by specifying redundant paths for the transmission of the environment information. The dependability and bandwidth may be traded-off by using the available overlapped communication area.

As described above, data from the roadside network may be used to identify a current traffic scenario. The traffic scenario may then be used to determine the KPI requirements for the roadside network. These KPI requirements may be used to lookup a roadside network configuration that meets the determined KPI requirements. When multiple configurations are available, a heuristic approach may be used to select a configuration. For example, the configuration with the highest reliability, the lowest cost, or the lowest latency may be selected.

The offline multi-objective optimization may be implemented using evolutionary algorithms or simulated annealing. For example, the design space of the roadside network may be explored by iterating over multiple different configurations. In each iteration, one or more potential solutions, e.g., network configurations, are evaluated with a set of objective evaluators, one for each KPI, to determine the fitness of the potential solution. Configurations that meet a threshold, e.g., all KPIs are above a minimum value, below a maximum value, or the best solution (in the), may be kept. For example, these configurations may be stored in a lookup table along with the calculated KPIs for that configuration.

Figure 11:
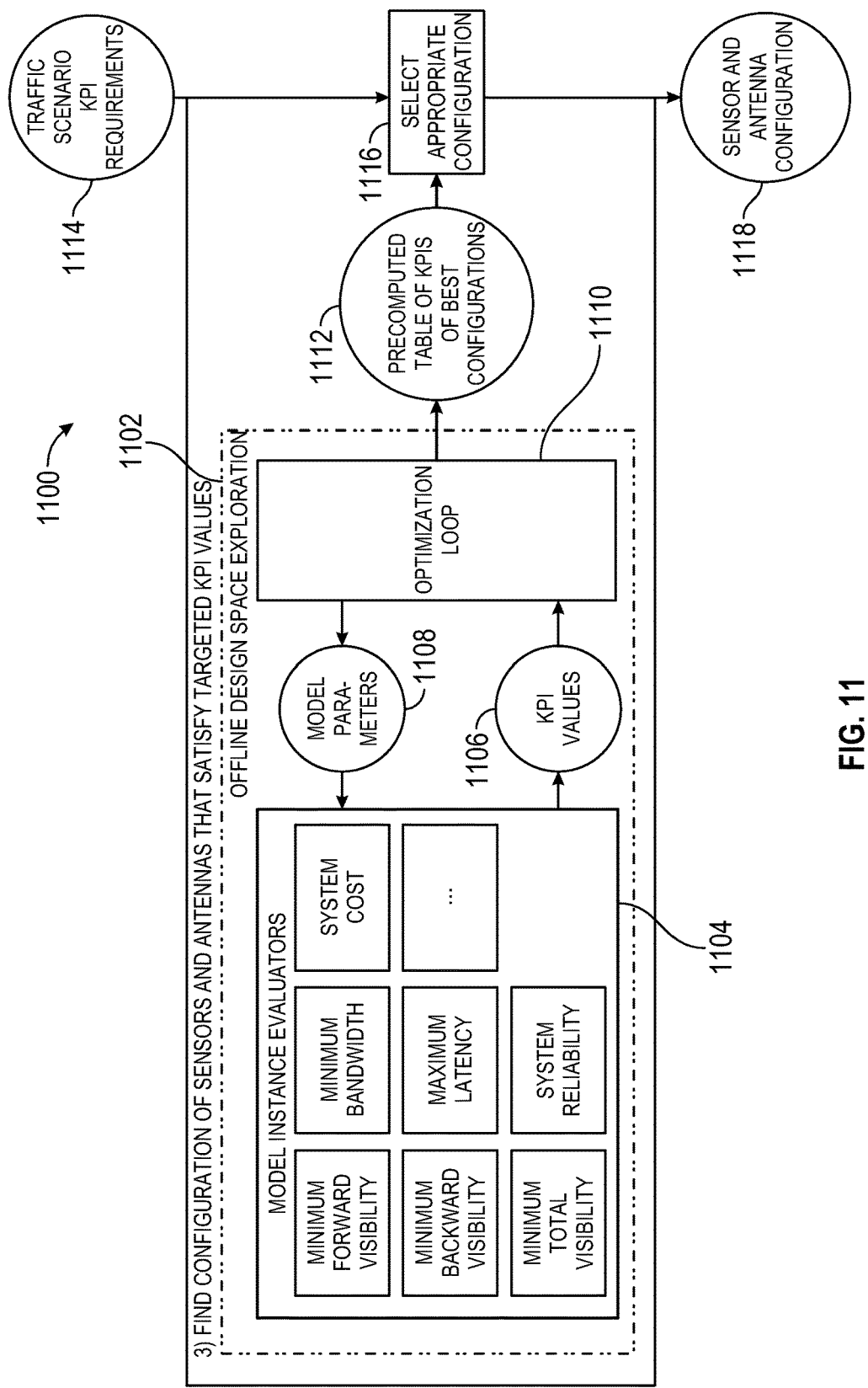
FIG. 11 illustrates a dataflow for identifying a roadside network configuration, according to an example.

FIG. 11 illustrates a dataflow 1100 for identifying a roadside network configuration, according to an example. The dataflow 1100 includes an offline portion 1102 that determines various different roadside configurations and the KPIs for those configurations. These configurations are then used with runtime data to select appropriate roadside network configurations. The offline portion 1102, uses a number of KPI model instance evaluators 1104. In an example, there is one evaluator for each KPI of the roadside network. Each KPI is set with a KPI value 1106. The KPI values 1106 are then optimized in an optimization loop 1110. For example, evolutionary algorithms and/or simulated annealing may be used to optimize a roadside network configuration. Each configuration has model parameters 1108, which are the updated KPI values for that configuration. These model parameters 1108 are evaluated by the KPI evaluators 1104. Once this optimization loop 1110 stops for a particular configuration, that roadside network configuration is stored, for example, stored in a look-up table 1112. The look-up table 1112 stores various configurations along with the associated KPIs for each configuration.

As described above, runtime information is used to identify a traffic scenario and associated KPI requirements for the traffic scenario 1114. The KPI requirements are used to select an appropriate roadside network configuration 1116. In an example, the selected roadside network configuration meets KPI requirements 1114. The selected configuration 1116 then provides the sensor and antennas configuration 1118 that meets the KPI requirements. The roadside network configuration may then be used to switch what sensors and what antennas are connected to a CPU.

A reference topology model of configurations of adjacent sensor and communication antennas may be used to define asymmetric and/or overlapping regions for the monitoring and distribution of environmental information.

Figure 12:
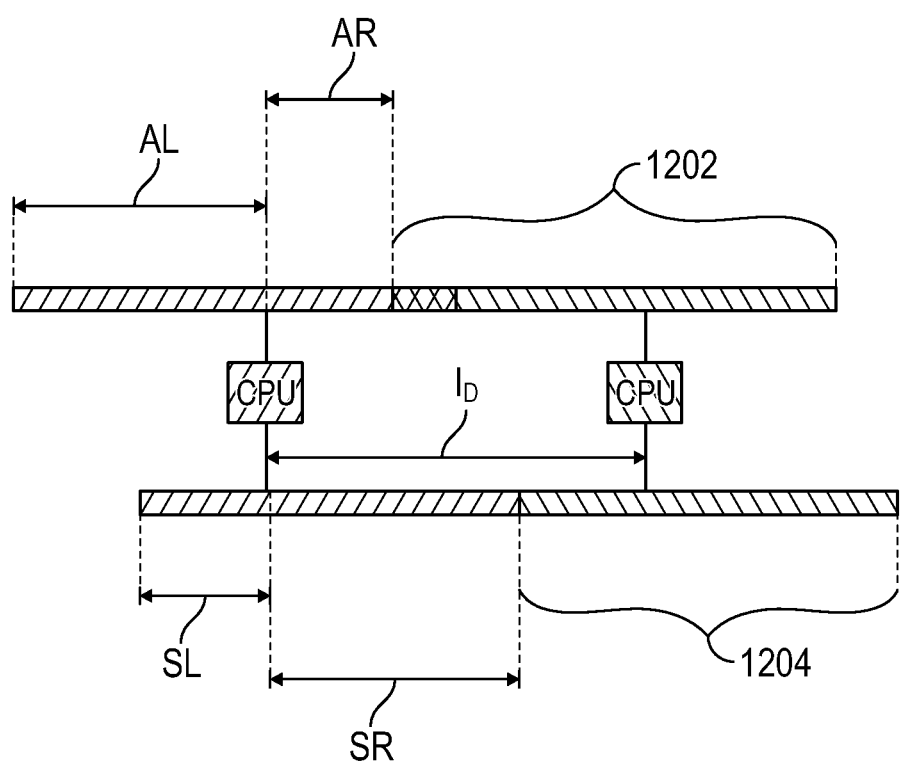
FIG. 12 illustrates a sector configuration of antenna and sensor ranges, according to an example.

FIG. 12 illustrates a sector configuration of antenna and sensor ranges, according to an example. This configuration may be parameterized by five different lengths: AL, AR, SL, SR, and $i_d$, which correspond to the left and right side of the antenna and sensor regions and the inter-CPU distance respectively. A sector has a communication range 1202. The SL and SR ranges may be used to define a sensor range 1204 for a sector.

The left and right-hand sides of both the sensor and antennas/communication sector ranges are parameters that may affect the following key performance indicators: minimum and maximum forward and backward visibility range, computational load, communication bandwidth, latency and dependability.

A roadside network configuration may be parameterized based on the various distances. This parameterized model of the configuration topology enables an analytical evaluation of the minimum/maximum, forward, backward and total visibility range, which may be estimated using the following formulas:

$$\mathrm{max}Fwd = A_L + S_R$$

$$\mathrm{max}Bck = A_R + S_L$$

$$\mathrm{min}Fwd = \begin{cases} A_L + S_R - i_d, & A_L + S_R \geq i_d \\ 0, & A_L + S_R < i_d \end{cases}$$

$$\mathrm{min}Bck = \begin{cases} A_R + S_L - i_d, & A_R + S_L \geq i_d \\ 0, & A_R + S_L < i_d \end{cases}$$

-continued $$\text{maxTotal} = \left(\frac{\lceil A_L + A_R \rceil}{i_d} - 1\right) \cdot i_d + S_L + S_R$$

$$\text{minTotal} = \text{maxTotal} - \left\lceil \frac{(A_L + A_R)\text{mod}(i_d)}{i_d} \right\rceil \cdot i_d$$

Furthermore, to guarantee a complete sensor coverage of the road and a complete transmission coverage for each sector, the following constraints may be considered. In an example, these constraints hold for each possible roadside network configuration. During the optimization loop 1110 in FIG. 11, any roadside network configuration that does not meet these constraints may be discarded.

$S_R + S_L \geq i_d$ $A_R + A_L \geq i_d$ $A_R + S_L \geq i_d$ $A_L + S_R \geq i_d$ These formulas enable a very fast evaluation of the visibility range, which enable more iterations on the optimization step to determine the best configurations for different sets of KPI requirements.

An example of the roadside network configuration uses proposed configurations for a wrong-way driver use case considering only the visibility range KPI. In a wrong-way driver situation along a road in a zone with no speed limit, with an assumed human reaction time of 2.5 seconds, and a relative velocity of the normal and miss-behaved vehicles of 280 km/h, a minimum of 217 m is necessary for the normal vehicle to react and change lane in an emergency maneuver. A change of lane requires a backward visibility range as well to avoid a potential collision with an overhauling vehicle. A backward visibility range of 100 m is enough for this example. Accordingly, the KPI requirements for this road are: minFwd≥217 m, minBck≥100 m.

In this example, only the visibility ranges were considered in finding an appropriate network configuration. An offline optimization of a roadside network was performed with a fixed inter-CPU distance value $i_d$=1200 m, a radar sensor inter-distance of 50 m, and an antenna distance of 300 m. A NSGA-II evolutionary algorithm was applied to explore different configurations for 20,000 iterations. Table 1 shows the pre-computed KPIs of the best configurations. All units are in meters. The last configuration is the most adequate solution for the considered KPI requirements.

than 217 m. These roadside network configurations, therefore, may be discarded. If other KPI requirements, such as latency and bandwidth considerations, are ignored the last row provides a larger minimum of total visibility range as well as a larger maximum forward visibility range compared to other three solutions. This configuration corresponds to an AR=AL=900 m, which means three communication antennas on the left and on the right are connected to a CPU, SR=850 m corresponds to 17 sensors on the right, and SL=400 m corresponds to 8 sensors on the left.

In an example, the reconfigurability of the roadside network may include mapping the communication antennas and sensors to a CPU dedicated to monitor, process and distribution of environment information on a road sector. To map sensors to CPUs, the switches in the communication backbone may be configured dynamically to forward sensor data in the appropriate direction(s) to reach the CPU target(s). Similarly, the switches may be dynamically configured to forward the CPU processed environment information to the communication antennas mapped to the CPU.

Figure 6:
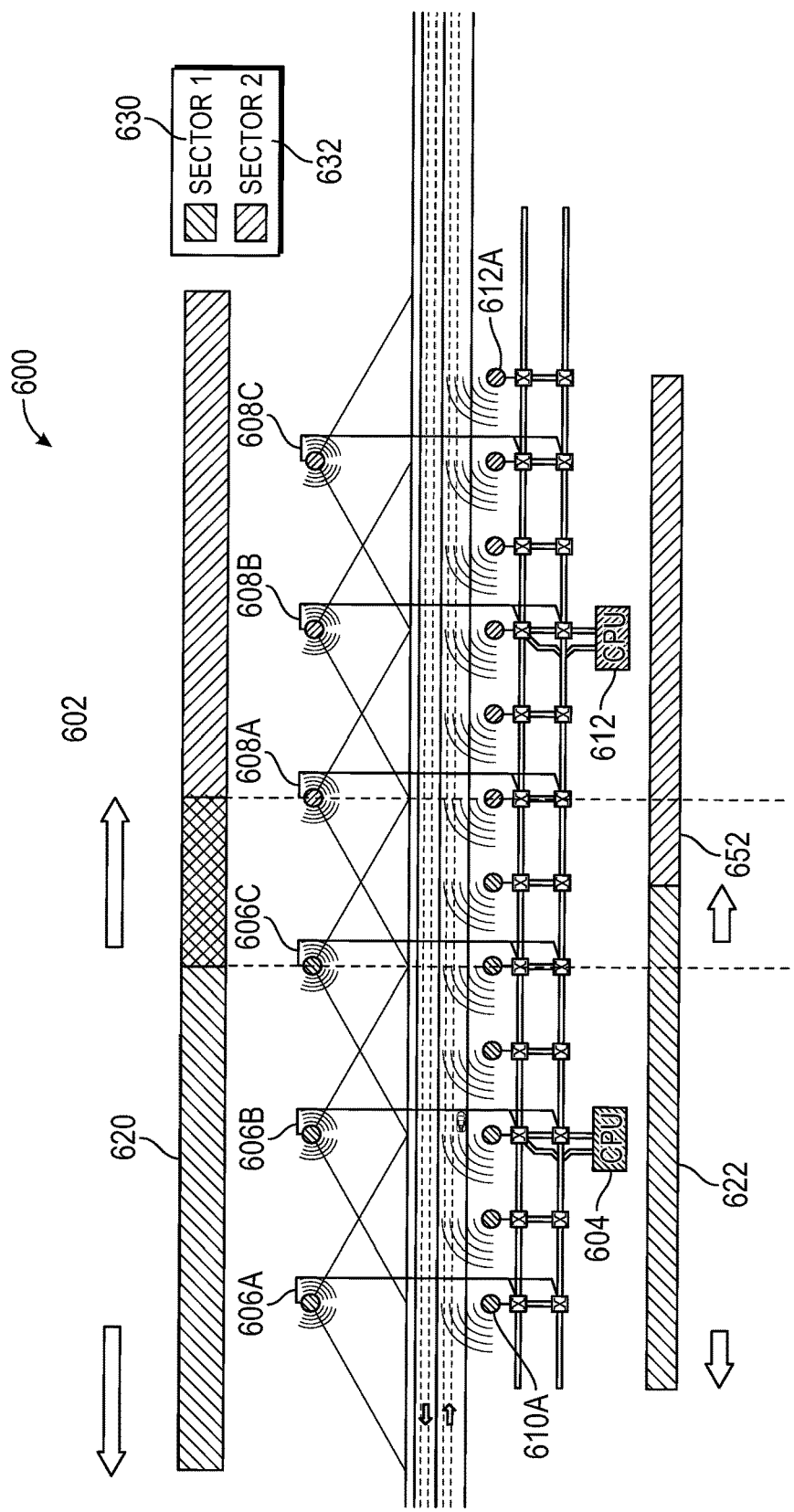
FIG. 6 illustrates a symmetrical sector configuration with an overlapping inter-section communication region according to an example.

FIG. 6 illustrates a symmetrical sector configuration of a roadside network 600 with an overlapping inter-section communication region according to an example. The area covered by the communication antennas mapped to a CPU define the communication range covered by the local sector, and the area covered by the mapped sensors define the sector sensor range. Furthermore, mapped sensors and communication antennas may not be necessarily adjacent and may belong to more than one sector to provide a flexible configuration of redundancy. The illustrated portion of the roadside network 600 includes two road sectors or sectors 630 and 632. Dividing the road into sectors 630 and 632 decreases the latency and computation load on a CPU. Each sector 630, 632 includes sensors, e.g., 610A and 612 A. In the illustrated example, the number sensors, e.g., six, are the same for both sectors. The sensors within a sector have a configurable sector sensor range 622.

In addition, each sector 630 and 632 includes three communication antennas. The first sector 630 includes the antennas 606A, 606B, and 606C, while the second sector 632 includes the antennas 608A, 608B, and 608C. The antennas have a sector communication range 620. This sector communication range 620 is configurable for each sector. Each of the sectors 630 and 632 also include one CPU 604 and 656, respectively. The antennas 606A, 606B, and 606C and the sensors, e.g. 610A, are mapped to the CPU 604

| id | AR | AL | SR | SL | minFwd | minBck | minTotal | maxBck | maxFwd | maxTotal |
|---|---|---|---|---|---|---|---|---|---|---|
| 1200 | 300 | 1200 | 200 | 1000 | 200 | 100 | 1200 | 1300 | 1400 | 1200 |
| 1200 | 600 | 1200 | 500 | 700 | 500 | 100 | 1200 | 1300 | 1700 | 1200 |
| 1200 | 600 | 1200 | 200 | 1000 | 200 | 400 | 1200 | 1600 | 1400 | 1200 |
| 1200 | 600 | 900 | 400 | 850 | 100 | 250 | 1250 | 1450 | 1300 | 1250 |
| 1200 | 1200 | 900 | 1100 | 100 | 800 | 100 | 1200 | 1300 | 2000 | 1200 |
| 1200 | 900 | 1200 | 600 | 600 | 600 | 300 | 1200 | 1500 | 1800 | 1200 |
| 1200 | 900 | 900 | 850 | 400 | 550 | 100 | 1250 | 1300 | 1750 | 1250 |

From the shown solutions, only four satisfy the KPI requirements. All the configurations have a minimum backward visibility (minBck) value of at least 100 m, so each configuration meets the minimum back visibility KPI requirement of 100 m. The minimum forward visibility KPI value, however, is 217 m, and three of the configurations have minimum forward visibility (minFwd) values of less and define the first sector 630. The CPU 656 defines the second sector 632. The antennas 608A, 608B, and 608C and the sensors, e.g., 612A, are mapped to the CPU 656.

This configuration is referred to a symmetrical configuration since the number of antennas, sensors, and CPUs are the same. A symmetrical sensor configuration is a configuration where the number of sensors per sector is the same.

The sector communication ranges from the first sector 630 and the second sector 632 have an overlapping region 602. This region 602 provides a larger than zero minimum forward and backward driving direction visibility.

Figure 7:
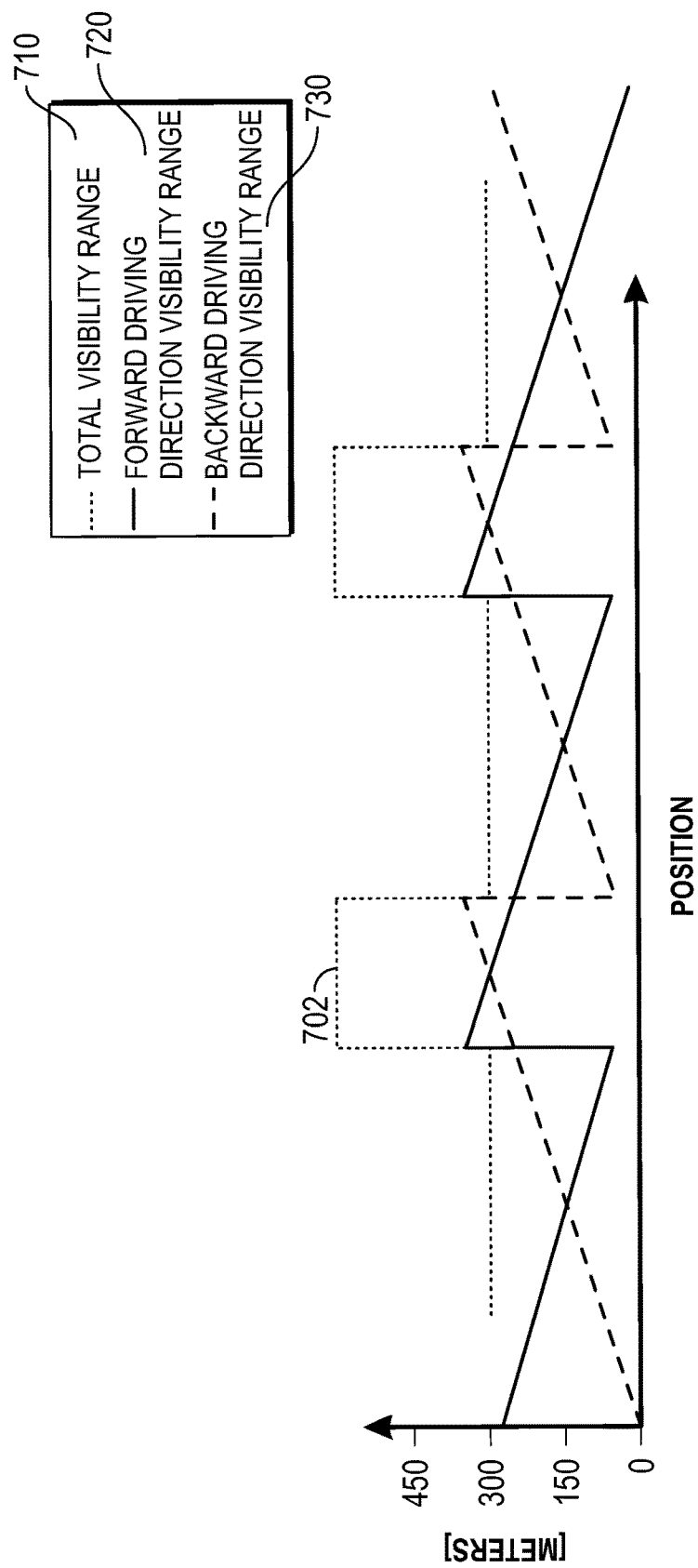
FIG. 7 illustrates the visibility for the roadside network according to the example in FIG. 6.

FIG. 7 illustrates the visibility for the roadside network according to the example in FIG. 6. A total visibility range 710, forward visibility range 720, and backward visibility range 730 is shown for a vehicle alone the road sectors shown in FIG. 6. As a vehicle drives down the road sectors, the sensors, e.g., 610A and 612A, may provide the vehicle with visibility both in front and/or behind the vehicle. As the vehicle drives through a sector, the forward visibility 720 and the backward visibility 730 will change based on the vehicle's position relative to the sensors along the road. The total visibility range 710 is a sum of the forward visibility range 720 and the backward visibility range 730. The overlapping region 602 in FIG. 6 provides a total visibility range 702 to be greater than when the vehicle is not within the overlapping region 602. In an example, this is due to a vehicle using data from both sectors 630 and 632. For example, as a vehicle approaches the end of the sector 630, the vehicle may receive forward data from sensors in the sector 632, while still receiving backward visibility data from the sector 630. The overlapping region 602, therefore, ensures there is a minimum forward visibility range that is greater than zero. If there were no overlapping region 602, the forward visibility range would be zero right before a vehicle enters the sector 632 from the second 630. In addition, the backward visibility would be zero immediately after that vehicle entered the sector 632. Thus, the overlapping regions ensure that a vehicle always has a minimum forward visibility and minimum backward visibility.

In other examples, the operations and functionality described above with reference to FIGS. 3 to 12 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 13:
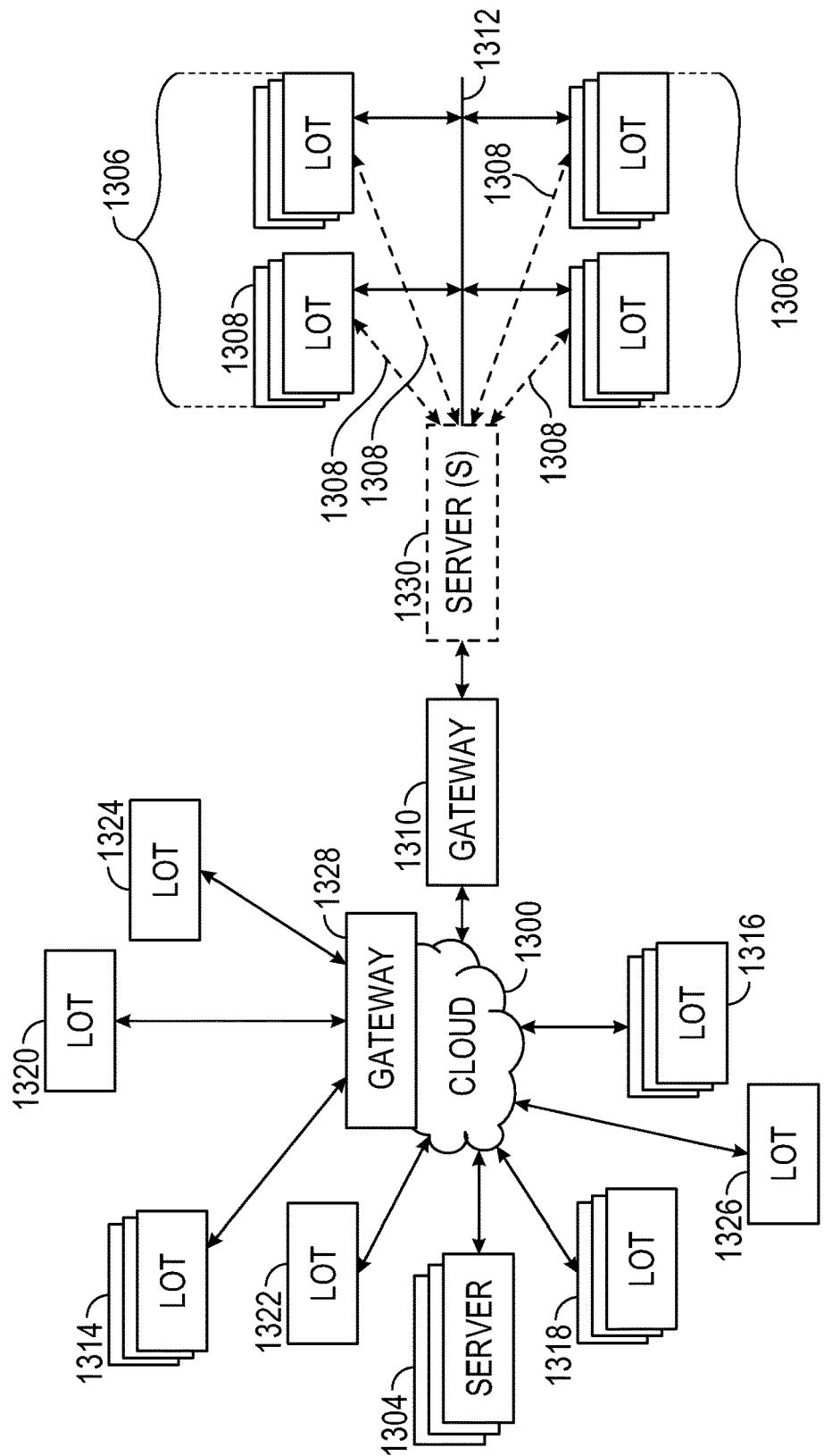
FIG. 13 illustrates a block diagram of a network illustrating communications among a number of IoT devices, according to an example.

FIG. 13 illustrates a drawing of a cloud computing network, or cloud 1300, in communication with a number of Internet of Things (IoT) devices. The cloud 1300 may represent the Internet, or may be a local area network (LAN), or a wide area network (WAN), such as a proprietary network for a company. The IoT devices may include any number of different types of devices, grouped in various combinations. For example, a traffic control group 1306 may include IoT devices along streets in a city. These IoT devices may include stoplights, traffic flow monitors, cameras, weather sensors, and the like. The traffic control group 1306, or other subgroups, may be in communication with the cloud 1300 through wired or wireless links 1308, such as LPWA links, optical links, and the like. Further, a wired or wireless sub-network 1312 may allow the IoT devices to communicate with each other, such as through a local area network, a wireless local area network, and the like. The IoT devices may use another device, such as a gateway 1410 or 1428 to communicate with remote locations such as the cloud 1400; the IoT devices may also use one or more servers 1430 to facilitate communication with the cloud 1400 or with the gateway 1410. For example, the one or more servers 1430 may operate as an intermediate network node to support a local edge cloud or fog implementation among a local area network. Further, the gateway 1428 that is depicted may operate in a cloud-to-gateway-to-many edge devices configuration, such as with the various IoT devices 1414, 1420, 1424 being constrained or dynamic to an assignment and use of resources in the cloud 1400.

Other example groups of IoT devices may include remote weather stations 1314, local information terminals 1316, alarm systems 1318, automated teller machines 1320, alarm panels 1322, or moving vehicles, such as emergency vehicles 1324 or other vehicles 1326, among many others. Each of these IoT devices may be in communication with other IoT devices, with servers 1304, with another IoT fog device or system (not shown, but depicted in FIG. 2), or a combination therein. The groups of IoT devices may be deployed in various residential, commercial, and industrial settings (including in both private or public environments).

As can be seen from FIG. 13, a large number of IoT devices may be communicating through the cloud 1300. This may allow different IoT devices to request or provide information to other devices autonomously. For example, a group of IoT devices (e.g., the traffic control group 1306) may request a current weather forecast from a group of remote weather stations 1314, which may provide the forecast without human intervention. Further, an emergency vehicle 1324 may be alerted by an automated teller machine 1320 that a burglary is in progress. As the emergency vehicle 1324 proceeds towards the automated teller machine 1320, it may access the traffic control group 1306 to request clearance to the location, for example, by lights turning red to block cross traffic at an intersection in sufficient time for the emergency vehicle 1324 to have unimpeded access to the intersection.

Clusters of IoT devices, such as the remote weather stations 1314 or the traffic control group 1306, may be equipped to communicate with other IoT devices as well as with the cloud 1300. This may allow the IoT devices to form an ad-hoc network between the devices, allowing them to function as a single device, which may be termed a fog device or system (e.g., as described above with reference to FIG. 2).

Figure 14:
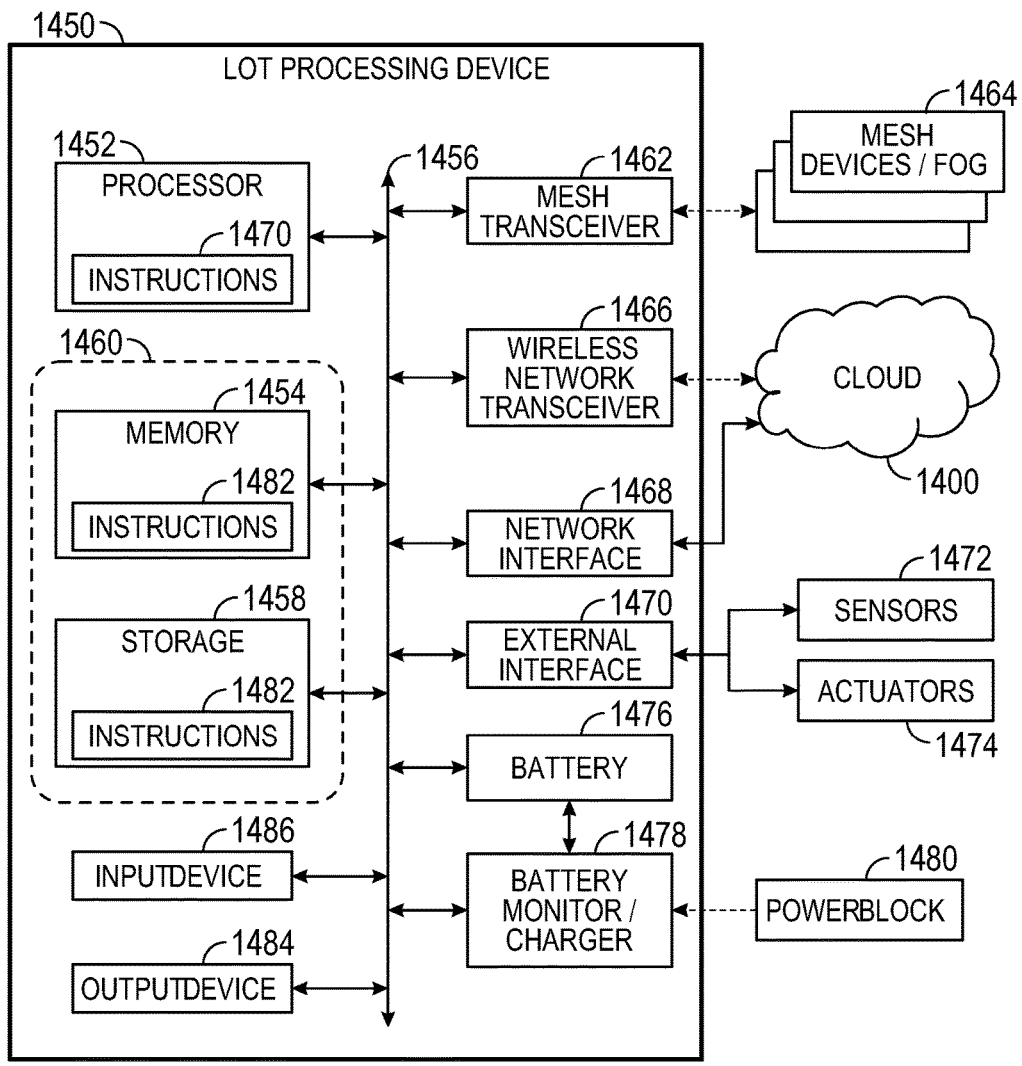
FIG. 14 illustrates a block diagram for an example IoT processing system architecture upon which any one or more of the techniques (e.g., operations, processes, methods, and methodologies) discussed herein may be performed, according to an example.

FIG. 14 is a block diagram of an example of components that may be present in an IoT device 1450 for implementing the techniques described herein. The IoT device 1450 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1450, or as components otherwise incorporated within a chassis of a larger system. Additionally, the block diagram of FIG. 14 is intended to depict a high-level view of components of the IoT device 1450. However, some of the components shown may be omitted, additional components may be present, and different arrangement of the components shown may occur in other implementations.

The IoT device 1450 may include a processor 1452, which may be a microprocessor, a multi-core processor, a multithreaded processor, an ultra-low voltage processor, an embedded processor, or other known processing element. The processor 1452 may be a part of a system on a chip (SoC) in which the processor 1452 and other components are formed into a single integrated circuit, or a single package, such as the Edison™ or Galileo™ SoC boards from Intel. As an example, the processor 1452 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1452 may communicate with a system memory 1454 over an interconnect 1456 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1458 may also couple to the processor 1452 via the interconnect 1456. In an example, the storage 1458 may be implemented via a solid-state disk drive (SSDD). Other devices that may be used for the storage 1458 include flash memory cards, such as SD cards, microSD cards, xD picture cards, and the like, and USB flash drives. In low power implementations, the storage 1458 may be on-die memory or registers associated with the processor 1452. However, in some examples, the storage 1458 may be implemented using a micro hard disk drive (HDD). Further, any number of new technologies may be used for the storage 1458 in addition to, or instead of, the technologies described, such resistance change memories, phase change memories, holographic memories, or chemical memories, among others.

The components may communicate over the interconnect 1456. The interconnect 1456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1456 may be a proprietary bus, for example, used in a SoC based system. Other bus systems may be included, such as an I2C interface, an SPI interface, point to point interfaces, and a power bus, among others.

The interconnect 1456 may couple the processor 1452 to a mesh transceiver 1462, for communications with other mesh devices 1464. The mesh transceiver 1462 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1464. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1462 may communicate using multiple standards or radios for communications at different range. For example, the IoT device 1450 may communicate with close devices, e.g., within about 10 meters, using a local transceiver based on BLE, or another low power radio, to save power. More distant mesh devices 1464, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1466 may be included to communicate with devices or services in the cloud 1400 via local or wide area network protocols. The wireless network transceiver 1466 may be a LPWA transceiver that follows the IEEE 802.15.4, or IEEE 802.15.4g standards, among others. The IoT device 1450 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1462 and wireless network transceiver 1466, as described herein. For example, the radio transceivers 1462 and 1466 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1462 and 1466 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1466, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1468 may be included to provide a wired communication to the cloud 1400 or to other devices, such as the mesh devices 1464. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1468 may be included to allow connect to a second network, for example, a NIC 1468 providing communications to the cloud over Ethernet, and a second NIC 1468 providing communications to other devices over another type of network.

The interconnect 1456 may couple the processor 1452 to an external interface 1470 that is used to connect external devices or subsystems. The external devices may include sensors 1472, such as accelerometers, level sensors, flow sensors, optical light sensors, camera sensors, temperature sensors, a global positioning system (GPS) sensors, pressure sensors, barometric pressure sensors, and the like. The external interface 1470 further may be used to connect the IoT device 1450 to actuators 1474, such as power switches, valve actuators, an audible sound generator, a visual warning device, and the like.

In some optional examples, various input/output (I/O) devices may be present within, or connected to, the IoT device 1450. For example, a display or other output device 1484 may be included to show information, such as sensor readings or actuator position. An input device 1486, such as a touch screen or keypad may be included to accept input. An output device 1484 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1450.

A battery 1476 may power the IoT device 1450, although in examples in which the IoT device 1450 is mounted in a fixed location, it may have a power supply coupled to an electrical grid. The battery 1476 may be a lithium ion battery, or a metal-air battery, such as a zinc-air battery, an aluminum-air battery, a lithium-air battery, and the like.

A battery monitor/charger 1478 may be included in the IoT device 1450 to track the state of charge (SoCh) of the battery 1476. The battery monitor/charger 1478 may be used to monitor other parameters of the battery 1476 to provide failure predictions, such as the state of health (SoH) and the state of function (SoF) of the battery 1476. The battery monitor/charger 1478 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1478 may communicate the information on the battery 1476 to the processor 1452 over the interconnect 1456. The battery monitor/charger 1478 may also include an analog-to-digital (ADC) convertor that allows the processor 1452 to directly monitor the voltage of the battery 1476 or the current flow from the battery 1476. The battery parameters may be used to determine actions that the IoT device 1450 may perform, such as transmission frequency, mesh network operation, sensing frequency, and the like.

A power block 1480, or other power supply coupled to a grid, may be coupled with the battery monitor/charger 1478 to charge the battery 1476. In some examples, the power block 1480 may be replaced with a wireless power receiver to obtain the power wirelessly, for example, through a loop antenna in the IoT device 1450. A wireless battery charging circuit, such as an LTC4020 chip from Linear Technologies of Milpitas, Calif., among others, may be included in the battery monitor/charger 1478. The specific charging circuits chosen depend on the size of the battery 1476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1458 may include instructions 1482 in the form of software, firmware, or hardware commands to implement the techniques described herein. Although such instructions 1482 are shown as code blocks included in the memory 1454 and the storage 1458, it may be understood that any of the code blocks may be replaced with hardwired circuits, for example, built into an application specific integrated circuit (ASIC).

In an example, the instructions 1482 provided via the memory 1454, the storage 1458, or the processor 1452 may be embodied as a non-transitory, machine readable medium 1460 including code to direct the processor 1452 to perform electronic operations in the IoT device 1450. The processor 1452 may access the non-transitory, machine readable medium 1460 over the interconnect 1456. For instance, the non-transitory, machine readable medium 1460 may be embodied by devices described for the storage 1458 of FIG. 13 or may include specific storage units such as optical disks, flash drives, or any number of other hardware devices. The non-transitory, machine readable medium 1460 may include instructions to direct the processor 1452 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

The functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code sectors, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a system for a roadside network, the system comprising: a first plurality of sensors to gather first traffic data associated with a first sector; a first processing unit to determine a minimum forward visibility range and to receive the first traffic data and generate first processed traffic data based on the first traffic data; a first plurality of antennas to transmit the first processed traffic data within the first sector; a second plurality of sensors to gather second traffic data associated with a second sector, wherein a first portion of the first sector overlaps a second portion of the second sector to provide the minimum forward visibility range; a second processing unit to receive the second traffic data and generate second processed traffic data based on the second traffic data; and a second plurality of antennas to transmit the second processed traffic data within the second sector.

In Example 2, the subject matter of Example 1 includes, wherein the first processing unit is further configured to determine a minimum backward visibility range.

In Example 3, the subject matter of Example 2 includes, wherein the first portion of the first sector overlaps a second portion of the second sector to provide the minimum backward visibility range.

In Example 4, the subject matter of Examples 1-3 includes, a first plurality of switches to connect the first plurality of sensors to the first central processing unit and to connect the first central processing unit with the first plurality of antennas; and a second plurality of switches to connect the second plurality of sensors to the second central processing unit and to connect the second central processing unit with the second plurality of antennas.

In Example 5, the subject matter of Examples 1-4 includes, wherein a communication range of the first sector is defined by a range of the first plurality of antennas.

In Example 6, the subject matter of Examples 1-5 includes, wherein a sensor range of the first sector is defined by a range of the first plurality of sensors.

In Example 7, the subject matter of Examples 1-6 includes, processing circuitry to: identify a traffic scenario on the first sector and the second sector; determine key performance indicators based on the identified traffic scenario for the roadside network; determine a configuration of the roadside network that meets the key performance indicators; and reconfigure the first plurality of sensors, the second plurality of sensors, the first plurality of antennas, and the second plurality of antennas to meet the key performance indicators.

In Example 8, the subject matter of Example 7 includes, wherein the reconfiguration changes a communication range of the first sector based on a number of antennas within the first plurality of antennas.

In Example 9, the subject matter of Examples 7-8 includes, wherein the reconfiguration changes a sensor range of the first sector based on a number of sensors within the first plurality of sensors.

In Example 10, the subject matter of Examples 7-9 includes, wherein the traffic scenario is identified based on a traffic flow of vehicles on the first sector and the second sector.

In Example 11, the subject matter of Examples 7-10 includes, wherein the traffic scenario is identified based on a traffic density of vehicles on the first sector and the second sector.

Example 12 is a machine-implemented method for a roadside network, the method comprising: receiving, from a first plurality of sensors, first traffic data associated with a first sector; determining a minimum forward visibility range; generating, at a first processing unit, first processed traffic data based on the first traffic data, sending, to a first plurality of antennas, the first processed traffic data within the first sector: receiving, from a second plurality of sensors, second traffic data associated with a second sector, wherein a first portion of the first sector overlaps a second portion of the second sector to provide the minimum forward visibility range; generating second processed traffic data based on the second traffic data; and sending, to a second plurality of antennas, the second processed traffic data within the second sector.

In Example 13, the subject matter of Example 12 includes, determining a minimum backward visibility range.

In Example 14, the subject matter of Example 13 includes, wherein the first portion of the first sector overlaps a second portion of the second sector to provide the minimum backward visibility range.

In Example 15, the subject matter of Examples 12-14 includes, connecting, via a first plurality of switches, the first plurality of sensors to the first central processing unit; and connecting, via the first plurality of switches, the first central processing unit with the first plurality of antennas.

In Example 16, the subject matter of Examples 12-15 includes, wherein a communication range of the first sector is defined by a range of the first plurality of antennas.

In Example 17, the subject matter of Examples 12-16 includes, wherein a sensor range of the first sector is defined by a range of the first plurality of sensors.

In Example 18, the subject matter of Examples 12-17 includes, identifying a traffic scenario on the first sector and the second sector; determining key performance indicators based on the identified traffic scenario for the roadside network; determining a configuration of the roadside network that meets the key performance indicators; and reconfiguring the first plurality of sensors, the second plurality of sensors, the first plurality of antennas, and the second plurality of antennas to meet the key performance indicators.

In Example 19, the subject matter of Example 18 includes, wherein the reconfiguration changes a range of the first plurality of antennas.

In Example 20, the subject matter of Examples 18-19 includes, wherein the reconfiguration changes a range of the first plurality of sensors.

In Example 21, the subject matter of Examples 18-20 includes, wherein the traffic scenario is identified based on a traffic flow of vehicles on the first sector and the second sector.

In Example 22, the subject matter of Examples 18-21 includes, wherein the traffic scenario is identified based on a traffic density of vehicles on the first sector and the second sector.

Example 23 is at least one computer-readable medium, including instructions, which when executed by a machine, cause the machine to perform operations for a roadside network, the operations comprising: receiving, from a first plurality of sensors, first traffic data associated with a first sector; determining a minimum forward visibility range; generating first processed traffic data based on the first traffic data; sending, to a first plurality of antennas, the first processed traffic data within the first sector; receiving, from a second plurality of sensors, second traffic data associated with a second sector, wherein a first portion of the first sector overlaps a second portion of the second sector to provide the minimum forward visibility range; generating second processed traffic data based on the second traffic data; and sending, to a second plurality of antennas, the second processed traffic data within the second sector.

In Example 24, the subject matter of Example 23 includes, wherein the operations further comprise determining a minimum backward visibility range.

In Example 25, the subject matter of Example 24 includes, wherein the first portion of the first sector overlaps a second portion of the second sector to provide the minimum backward visibility range.

In Example 26, the subject matter of Examples 23-25 includes, wherein the operations further comprise: connecting, via a first plurality of switches, the first plurality of sensors to the first central processing unit; and connecting, via the first plurality of switches, the first central processing unit with the first plurality of antennas.

In Example 27, the subject matter of Examples 23-26 includes, wherein a communication range of the first sector is defined by a range of the first plurality of antennas.

In Example 28, the subject matter of Examples 23-27 includes, wherein a sensor range of the first sector is defined by a range of the first plurality of sensors.

In Example 29, the subject matter of Examples 23-28 includes, wherein the operations further comprise: identifying a traffic scenario on the first sector and the second sector; determining key performance indicators based on the identified traffic scenario for the roadside network; determining a configuration of the roadside network that meets the key performance indicators; and reconfiguring the first plurality of sensors, the second plurality of sensors, the first plurality of antennas, and the second plurality of antennas to meet the key performance indicators.

In Example 30, the subject matter of Example 29 includes, wherein the reconfiguration changes a range of the first plurality of antennas.

In Example 31, the subject matter of Examples 29-30 includes, wherein the reconfiguration changes a range of the first plurality of sensors.

In Example 32, the subject matter of Examples 29-31 includes, wherein the traffic scenario is identified based on a traffic flow of vehicles on the first sector and the second sector.

In Example 33, the subject matter of Examples 29-32 includes, wherein the traffic scenario is identified based on a traffic density of vehicles on the first sector and the second sector.

Example 34 is an apparatus for a roadside network, the apparatus comprising: means for receiving, from a first plurality of sensors, first traffic data associated with a first sector, means for determining a minimum forward visibility range; means for generating first processed traffic data based on the first traffic data; means for sending, to a first plurality of antennas, the first processed traffic data within the first sector; means for receiving, from a second plurality of sensors, second traffic data associated with a second sector, wherein a first portion of the first sector overlaps a second portion of the second sector to provide the minimum forward visibility range; means for generating second processed traffic data based on the second traffic data; and means for sending, to a second plurality of antennas, the second processed traffic data within the second sector.

In Example 35, the subject matter of Example 34 includes, means for determining a minimum backward visibility range.

In Example 36, the subject matter of Example 35 includes, wherein the first portion of the first sector overlaps a second portion of the second sector to provide the minimum backward visibility range.

In Example 37, the subject matter of Examples 34-36 includes, means for connecting, via a first plurality of switches, the first plurality of sensors to the first central processing unit; and means for connecting, via the first plurality of switches, the first central processing unit with the first plurality of antennas.

In Example 38, the subject matter of Examples 34-37 includes, wherein a communication range of the first sector is defined by a range of the first plurality of antennas.

In Example 39, the subject matter of Examples 34-38 includes, wherein a sensor range of the first sector is defined by a range of the first plurality of sensors.

In Example 40, the subject matter of Examples 34-39 includes, means for identifying a traffic scenario on the first sector and the second sector; means for determining key performance indicators based on the identified traffic scenario for the roadside network; means for determining a configuration of the roadside network that meets the key performance indicators; and means for reconfiguring the first plurality of sensors, the second plurality of sensors, the first plurality of antennas, and the second plurality of antennas to meet the key performance indicators.

In Example 41, the subject matter of Example 40 includes, wherein the reconfiguration changes a range of the first plurality of antennas.

In Example 42, the subject matter of Examples 40-41 includes, wherein the reconfiguration changes a range of the first plurality of sensors.

In Example 43, the subject matter of Examples 40-42 includes, wherein the traffic scenario is identified based on a traffic flow of vehicles on the first sector and the second sector.

In Example 44, the subject matter of Examples 40-43 includes, wherein the traffic scenario is identified based on a traffic density of vehicles on the first sector and the second sector.

Example 45 is at least one machine-readable medium including instructions, which when executed by a machine, cause the machine to perform operations of any of the operations of Examples 12-22.

Example 46 is an apparatus comprising means for performing any of the operations of Examples 12-22.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

Example 51 is a system for reconfiguring a roadside network, the system comprising: processing circuitry to: receive, from a plurality of sensors, current traffic data of a sector; identify a traffic scenario based on current the traffic data; determine key performance indicators for the traffic scenario; determine a roadside network configuration based on the key performance indicators; and reconfigure the roadside network based on the roadside network configuration.

In Example 52, the subject matter of Example 51 includes, wherein the traffic data comprises traffic density of the sector and traffic flow of the sector.

In Example 53, the subject matter of Example 52 includes, wherein the processing circuitry is further configured to: measure historical traffic data over a period of time; and compute traffic scenario boundaries based on the historical traffic data.

In Example 54, the subject matter of Example 53 includes, wherein the processing circuitry is further configured to determine key performance indicators for each of the traffic scenarios.

In Example 55, the subject matter of Example 54 includes, a data store to store the traffic scenario boundaries and the key performance indicators for each of the traffic scenarios.

In Example 56, the subject matter of Examples 53-55 includes, wherein to determine the traffic scenario the processing circuitry is configured to: compare the traffic density of the historical traffic data to density threshold values based on vehicle speeds from the historical traffic data; and compare the traffic flow of the historical traffic data to flow threshold values based on the vehicle speeds from the historical traffic data.

In Example 57, the subject matter of Examples 51-56 includes, wherein the key performance indicators comprise minimum forward visibility range and backward visibility range.

In Example 58, the subject matter of Examples 51-57 includes, wherein the processing circuitry is further configured to: optimize a first roadside network configuration for a target key performance indicator; determine the network configuration meets minimum values for the target key performance indicator; and store the first roadside network configuration.

In Example 59, the subject matter of Example 58 includes, wherein the processing circuitry is further configured to determine a current roadside network configuration does not meet the determined key performance indicators.

In Example 60, the subject matter of Example 59 includes, wherein to reconfigure the roadside network the processing circuitry is configured to: map, using a first switch, a first number of sensors to a central processing unit; and map, using a second switch, a first number of antennas to the central processing unit.

Example 61 is a machine-implemented method for reconfiguring a roadside network, the method comprising: receiving, from a plurality of sensors, current traffic data of a sector; identifying a traffic scenario based on current the traffic data; determining key performance indicators for the traffic scenario; determining a roadside network configuration based on the key performance indicators; and reconfiguring the roadside network based on the roadside network configuration.

In Example 62, the subject matter of Example 61 includes, wherein the traffic data comprises traffic density of the sector and traffic flow of the sector.

In Example 63, the subject matter of Example 62 includes, measuring historical traffic data over a period of time; and computing traffic scenario boundaries based on the historical traffic data.

In Example 64, the subject matter of Example 63 includes, determining key performance indicators for each of the traffic scenarios.

In Example 65, the subject matter of Example 64 includes, storing the traffic scenario boundaries and the key performance indicators for each of the traffic scenarios.

In Example 66, the subject matter of Examples 63-65 includes, wherein the determining the traffic scenario comprises: comparing the traffic density of the historical traffic data to density threshold values based on vehicle speeds from the historical traffic data; and comparing the traffic flow of the historical traffic data to flow threshold values based on the vehicle speeds from the historical traffic data.

In Example 67, the subject matter of Examples 61-66 includes, wherein the key performance indicators comprise minimum forward visibility range and backward visibility range.

In Example 68, the subject matter of Examples 61-67 includes, optimizing a first roadside network configuration for a target key performance indicator; determining the network configuration meets minimum values for the target key performance indicator; and storing the first roadside network configuration.

In Example 69, the subject matter of Example 68 includes, determining a current roadside network configuration does not meet the determined key performance indicators.

In Example 70, the subject matter of Example 69 includes, wherein the reconfiguring the roadside network comprises: connecting, using a first switch, a first number of sensors to a central processing unit; and connecting, using a second switch, a first number of antennas to the central processing unit.

Example 71 is at least one computer-readable medium, including instructions, which when executed by a machine, cause the machine to perform operations for reconfiguring a roadside network, the operations comprising: receiving, from a plurality of sensors, current traffic data of a sector; identifying a traffic scenario based on current the traffic data; determining key performance indicators for the traffic scenario; determining a roadside network configuration based on the key performance indicators; and reconfiguring the roadside network based on the roadside network configuration.

In Example 72, the subject matter of Example 71 includes, wherein the traffic data comprises traffic density of the sector and traffic flow of the sector.

In Example 73, the subject matter of Example 72 includes, wherein the operations further comprise: measuring historical traffic data over a period of time; and computing traffic scenario boundaries based on the historical traffic data.

In Example 74, the subject matter of Example 73 includes, wherein the operations further comprise determining key performance indicators for each of the traffic scenarios.

In Example 75, the subject matter of Example 74 includes, wherein the operations further comprise storing the traffic scenario boundaries and the key performance indicators for each of the traffic scenarios.

In Example 76, the subject matter of Examples 73-75 includes, wherein the determining the traffic scenario operation comprises: comparing the traffic density of the historical traffic data to density threshold values based on vehicle speeds from the historical traffic data; and comparing the traffic flow of the historical traffic data to flow threshold values based on the vehicle speeds from the historical traffic data.

In Example 77, the subject matter of Examples 71-76 includes, wherein the key performance indicators comprise minimum forward visibility range and backward visibility range.

In Example 78, the subject matter of Examples 71-77 includes, wherein the operations further comprise: optimizing a first roadside network configuration for a target key performance indicator; determining the network configuration meets minimum values for the target key performance indicator; and storing the first roadside network configuration.

In Example 79, the subject matter of Example 78 includes, wherein the operations further comprise determining a current roadside network configuration does not meet the determined key performance indicators.

In Example 80, the subject matter of Example 79 includes, wherein the reconfiguring the roadside network operation comprises: connecting, using a first switch, a first number of sensors to a central processing unit; and connecting, using a second switch, a first number of antennas to the central processing unit.

Example 81 is an apparatus for reconfiguring a roadside network, the apparatus comprising: means for receiving, from a plurality of sensors, current traffic data of a sector; means for identifying a traffic scenario based on current the traffic data; means for determining key performance indicators for the traffic scenario; means for determining a roadside network configuration based on the key performance indicators; and means for reconfiguring the roadside network based on the roadside network configuration.

In Example 82, the subject matter of Example 81 includes, wherein the traffic data comprises traffic density of the sector and traffic flow of the sector.

In Example 83, the subject matter of Example 82 includes, means for measuring historical traffic data over a period of time; and means for computing traffic scenario boundaries based on the historical traffic data.

In Example 84, the subject matter of Example 83 includes, determining key performance indicators for each of the traffic scenarios.

In Example 85, the subject matter of Example 84 includes, storing the traffic scenario boundaries and the key performance indicators for each of the traffic scenarios.

In Example 86, the subject matter of Examples 83-85 includes, wherein the determining the traffic scenario comprises: means for comparing the traffic density of the historical traffic data to density threshold values based on vehicle speeds from the historical traffic data; and means for comparing the traffic flow of the historical traffic data to flow threshold values based on the vehicle speeds from the historical traffic data.

In Example 87, the subject matter of Examples 81-86 includes, wherein the key performance indicators comprise minimum forward visibility range and backward visibility range.

In Example 88, the subject matter of Examples 81-87 includes, means for optimizing a first roadside network configuration for a target key performance indicator; means for determining the network configuration meets minimum values for the target key performance indicator; and means for storing the first roadside network configuration.

In Example 89, the subject matter of Example 88 includes, determining a current roadside network configuration does not meet the determined key performance indicators.

In Example 90, the subject matter of Example 89 includes, wherein the reconfiguring the roadside network comprises: means for connecting, using a first switch, a first number of sensors to a central processing unit; and means for connecting, using a second switch, a first number of antennas to the central processing unit.

Example 91 is at least one machine-readable medium including instructions, which when executed by a machine, cause the machine to perform operations of any of the operations of Examples 61-70.

Example 92 is an apparatus comprising means for performing any of the operations of Examples 61-70.

Example 93 is at least one machine-readable medium including instructions that, when executed by processing circuitry, cause the processing circuitry to perform operations to implement of any of Examples 51-92.

Example 94 is an apparatus comprising means to implement of any of Examples 51-92.

Example 95 is a system to implement of any of Examples 51-92.

Example 96 is a method to implement of any of Examples 51-92.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A system for a roadside network, the system comprising:
one or more electronic processors configured to:
receive, from a first plurality of sensors, first traffic data associated with a first sector;
determine a minimum forward visibility range;
generate first processed traffic data based on the first traffic data;
send, to a first plurality of antennas, the first processed traffic data to transmit first processed traffic data within the first sector;
receive, from a second plurality of sensors, second traffic data associated with a second sector, wherein a first portion of the first sector overlaps a second portion of the second sector to provide the minimum forward visibility range;
generate second processed traffic data based on the second traffic data;
send, to a second plurality of antennas, the second processed traffic data to transmit the second processed traffic data within the second sector;
identify a traffic scenario on the first sector and the second sector;
determine key performance indicators based on the identified traffic scenario for the roadside network;
determine a configuration of the roadside network that meets the key performance indicators; and
reconfigure the first plurality of sensors, the second plurality of sensors, the first plurality of antennas, and the second plurality of antennas to meet the key performance indicators.

2. The system of claim 1, wherein the one or more electronic processors are further configured to determine a minimum backward visibility range.

3. The system of claim 2, wherein the first portion of the first sector overlaps a second portion of the second sector to provide the minimum backward visibility range.

4. The system of claim 1, wherein the one or more electronic processors are further configured to:
connect, using a first plurality of switches, the first plurality of sensors to the first central processing unit and to connect the first central processing unit with the first plurality of antennas; and
connect, using a second plurality of switches, the second plurality of sensors to the second central processing unit and to connect the second central processing unit with the second plurality of antennas.

5. The system of claim 1, wherein a communication range of the first sector is defined by a range of the first plurality of antennas.

6. The system of claim 1 wherein a sensor range of the first sector is defined by a range of the first plurality of sensors.

7. The system of claim 1, wherein the reconfiguration changes a communication range of the first sector based on a number of antennas within the first plurality of antennas.

8. The system of claim 1, wherein the reconfiguration changes a sensor range of the first sector based on a number of sensors within the first plurality of sensors.

9. The system of claim 1, wherein the traffic scenario is identified based on a traffic flow of vehicles on the first sector and the second sector.

10. The system of claim 1, wherein the traffic scenario is identified based on a traffic density of vehicles on the first sector and the second sector.

11. A machine-implemented method for a roadside network, the method comprising:
receiving, from a first plurality of sensors, first traffic data associated with a first sector;
determining a minimum forward visibility range;
generating, at a first processing unit, first processed traffic data based on the first traffic data;
sending, to a first plurality of antennas, the first processed traffic data within the first sector;
receiving, from a second plurality of sensors, second traffic data associated with a second sector, wherein a first portion of the first sector overlaps a second portion of the second sector to provide the minimum forward visibility range;
generating second processed traffic data based on the second traffic data;
sending, to a second plurality of antennas, the second processed traffic data within the second sector;
identifying a traffic scenario on the first sector and the second sector;
determining key performance indicators based on the identified traffic scenario for the roadside network;
determining a configuration of the roadside network that meets the key performance indicators; and
reconfiguring the first plurality of sensors, the second plurality of sensors, the first plurality of antennas, and the second plurality of antennas to meet the key performance indicators.

12. The method of claim 11, further comprising determining a minimum backward visibility range.

13. The method of claim 12, wherein the first portion of the first sector overlaps a second portion of the second sector to provide the minimum backward visibility range.

14. The method of claim 11, further comprising:
connecting, via a first plurality of switches, the first plurality of sensors to the first central processing unit; and
connecting, via the first plurality of switches, the first central processing unit with the first plurality of antennas.

15. The method of claim 11, wherein a communication range of the first sector is defined by a range of the first plurality of antennas.

16. The method of claim 11, wherein a sensor range of the first sector is defined by a range of the first plurality of sensors.

17. At least one non-transitory computer-readable medium, including instructions, which when executed by a machine, cause the machine to perform operations for a roadside network, the operations comprising:
receiving, from a first plurality of sensors, first traffic data associated with a first sector;
determining a minimum forward visibility range;
generating first processed traffic data based on the first traffic data;
sending, to a first plurality of antennas, the first processed traffic data within the first sector;
receiving, from a second plurality of sensors, second traffic data associated with a second sector, wherein a first portion of the first sector overlaps a second portion of the second sector to provide the minimum forward visibility range;
generating second processed traffic data based on the second traffic data;

sending, to a second plurality of antennas, the second processed traffic data within the second sector;

identifying a traffic scenario on the first sector and the second sector;

determining key performance indicators based on the identified traffic scenario for the roadside network;

determining a configuration of the roadside network that meets the key performance indicators; and reconfiguring the first plurality of sensors, the second plurality of sensors, the first plurality of antennas, and the second plurality of antennas to meet the key performance indicators.

18. The at least one non-transitory computer-readable medium of claim 17, wherein the operations further comprise determining a minimum backward visibility range.

19. An apparatus for a roadside network, the apparatus comprising:

means for receiving, from a first plurality of sensors, first traffic data associated with a first sector;

means for determining a minimum forward visibility range;

means for generating first processed traffic data based on the first traffic data;

means for sending, to a first plurality of antennas, the first processed traffic data within the first sector;

means for receiving, from a second plurality of sensors, second traffic data associated with a second sector, wherein a first portion of the first sector overlaps a second portion of the second sector to provide the minimum forward visibility range;

means for generating second processed traffic data based on the second traffic data;

means for sending, to a second plurality of antennas, the second processed traffic data within the second sector;

means for identifying a traffic scenario on the first sector and the second sector;

means for determining key performance indicators based on the identified traffic scenario for the roadside network;

means for determining a configuration of the roadside network that meets the key performance indicators; and means for reconfiguring the first plurality of sensors, the second plurality of sensors, the first plurality of antennas, and the second plurality of antennas to meet the key performance indicators.

20. The apparatus of claim 19, further comprising means for determining a minimum backward visibility range.

21. The apparatus of claim 20, wherein the first portion of the first sector overlaps a second portion of the second sector to provide the minimum backward visibility range.

22. The apparatus of claim 20, further comprising:

means for connecting, via a first plurality of switches, the first plurality of sensors to the first central processing unit; and means for connecting, via the first plurality of switches, the first central processing unit with the first plurality of antennas.

23. The apparatus of claim 20, wherein a communication range of the first sector is defined by a range of the first plurality of antennas.

* * * * *

UNITED STATES PATENT AND TRADEMARK OFFICE
CERTIFICATE OF CORRECTION

PATENT NO. : 10,403,135 B2
APPLICATION NO. : 15/858417
DATED : September 3, 2019
INVENTOR(S) : Rosales et al.

Page 1 of 1

It is certified that error appears in the above-identified patent and that said Letters Patent is hereby corrected as shown below:

In the Claims

In Column 31, Line 15, in Claim 1, after "transmit", insert --the--

Signed and Sealed this
Thirty-first Day of March, 2020

Andrei Iancu
*Director of the United States Patent and Trademark Office*